(12) United States Patent
Braam et al.

(10) Patent No.: US 12,043,364 B2
(45) Date of Patent: *Jul. 23, 2024

(54) AERIAL VEHICLE AIRFRAME DESIGN AND MANUFACTURING

(71) Applicant: Amazon Technologies, Inc., Seattle, WA (US)

(72) Inventors: Jon T. Braam, Seattle, WA (US); Kyle Thomas Miller, Seattle, WA (US); Bradley David Urban, Bainbridge Island, WA (US); Raffaele Cipolletta, Kirkland, WA (US); Rahul Bhardwaj, Sammamish, WA (US); Dominic Shiosaki, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/160,658

(22) Filed: Jan. 27, 2023

(65) Prior Publication Data

US 2023/0174216 A1 Jun. 8, 2023

Related U.S. Application Data

(63) Continuation of application No. 16/898,753, filed on Jun. 11, 2020, now Pat. No. 11,597,489.

(51) Int. Cl.
*B64C 1/06* (2006.01)
*B64C 1/10* (2006.01)
(Continued)

(52) U.S. Cl.
CPC ............ *B64C 1/061* (2013.01); *B64C 1/10* (2013.01); *B64C 1/26* (2013.01); *B64C 29/02* (2013.01);
(Continued)

(58) Field of Classification Search
CPC ..... B64C 39/06; B64C 39/062; B64C 39/068; B64C 1/06; B64C 1/061; B64C 1/068;
(Continued)

(56) References Cited

U.S. PATENT DOCUMENTS 10,183,747 B1 1/2019 Longhi et al.
11,440,671 B2 9/2022 Kimchi et al.
(Continued)

FOREIGN PATENT DOCUMENTS

KR 20210055263 A 5/2021
WO 8501489 A1 4/1985
(Continued)

OTHER PUBLICATIONS

Hitti, Natashah, "Amazon Prime Air drone to deliver purchases by drone 'within months'," Jun. 6, 2019 (Jun. 6, 2019), XP055834617, URL: https://www.dezeen.com/2019/06/06/amazon-prime-air-drone-news/, [retrieved on Aug. 24, 2021], 4 pages.
(Continued)

*Primary Examiner* — Joshua J Michener
*Assistant Examiner* — Ryan Andrew Yankey
(74) *Attorney, Agent, or Firm* — Athorus, PLLC

(57) ABSTRACT

An airframe design may include a bonded frame or assembly, and one or more components that may be removably attached to the bonded frame. The bonded frame may include struts, central bulkheads, a tail section, a plurality of wing sections, and motor mounts that are adhered together using adhesive. The one or more attachable components may include a forward fuselage, motors, propellers, motor pod fairings, stabilizer fins, and landing gear that are attached using fasteners. The bonded frame may reduce the number of parts of the airframe design and may also reduce complexity, cost, and weight, while also increasing stiffness and strength. Further, the various attachable components may
(Continued)

facilitate fabrication, assembly, and maintenance of an aerial vehicle having the airframe design.

20 Claims, 20 Drawing Sheets

(51) Int. Cl.
  *B64C 1/26* (2006.01)
  *B64C 29/02* (2006.01)
  *B64C 39/02* (2023.01)
  *B64C 39/06* (2006.01)
  *B64F 5/10* (2017.01)
(52) U.S. Cl.
  CPC .......... *B64C 39/024* (2013.01); *B64C 39/062* (2013.01); *B64F 5/10* (2017.01)
(58) Field of Classification Search
  CPC .. B64C 3/18; B64C 2201/02; B64C 2201/128
  See application file for complete search history.

(56) References Cited

U.S. PATENT DOCUMENTS

| | | | | |
|---|---|---|---|---|
| 11,485,489 | B2 * | 11/2022 | Kisly | B64C 3/20 |
| 11,485,490 | B2 * | 11/2022 | Petrov | B64C 29/02 |
| 11,603,194 | B2 * | 3/2023 | McCullough | B64C 29/02 |
| 11,649,053 | B2 * | 5/2023 | Kimchi | B64C 27/20 |
| | | | | 244/6 |
| 11,760,474 | B2 * | 9/2023 | Wang | B64C 25/32 |
| | | | | 244/7 A |
| 11,772,789 | B2 * | 10/2023 | Bianco Mengotti | B64C 39/08 |
| | | | | 244/7 B |
| 11,794,892 | B2 * | 10/2023 | Bianco Mengotti | B64C 39/068 |
| 2017/0291677 | A1 | 10/2017 | Harris | |
| 2019/0106192 | A1 | 4/2019 | Woodworth et al. | |
| 2019/0161153 | A1 | 5/2019 | Woodworth et al. | |
| 2020/0062384 | A1 * | 2/2020 | McCullough | G05D 1/0011 |
| 2020/0081432 | A1 | 3/2020 | Szmuk et al. | |
| 2020/0086984 | A1 | 3/2020 | LeGrand et al. | |
| 2020/0086985 | A1 | 3/2020 | LeGrand et al. | |
| 2020/0086986 | A1 | 3/2020 | LeGrand et al. | |
| 2020/0089227 | A1 | 3/2020 | LeGrand et al. | |
| 2020/0239150 | A1 | 7/2020 | Kimchi et al. | |
| 2021/0362857 | A1 | 11/2021 | McCullough et al. | |
| 2021/0362866 | A1 | 11/2021 | Tian | |
| 2021/0365049 | A1 | 11/2021 | McCullough et al. | |
| 2023/0150701 | A1 * | 5/2023 | Yartha | B64U 30/10 |
| | | | | 244/17.23 |
| 2023/0303248 | A1 * | 9/2023 | Kimchi | B64C 29/02 |
| | | | | 244/6 |

FOREIGN PATENT DOCUMENTS

| | | |
|---|---|---|
| WO | 2016138173 A1 | 9/2016 |
| WO | 2019104271 A1 | 5/2019 |

OTHER PUBLICATIONS

International Search Report and Written Opinion for International Application No. PCT/US2021/035877, dated Sep. 3, 2021.
Wilke, Jeff, "A drone program taking flight," Published Jun. 5, 2019, Amazon, Retrieved May 17, 2022, https:// www.aboutamazon.com/news/transportation/a-drone-program-taking-flight . (Year: 2019).

* cited by examiner

AERIAL VEHICLE AIRFRAME DESIGN AND MANUFACTURING

CROSS-REFERENCE TO RELATED APPLICATION

This application is a continuation of and claims priority to U.S. application Ser. No. 16/898,753, filed Jun. 11, 2020, the contents of which are herein incorporated by reference in their entirety.

BACKGROUND

Unmanned vehicles, such as unmanned aerial vehicles ("UAV"), ground, or water based automated vehicles, are continuing to increase in use. For example, UAVs are often used by hobbyists to obtain aerial images of buildings, landscapes, etc. Likewise, unmanned ground based units are often used in materials handling facilities to autonomously transport inventory within the facility. However, design, manufacturing, and assembly of aerial vehicles may be complex, difficult, and expensive. Accordingly, there is a need for aerial vehicle designs to lower weight, increase stiffness, reduce costs, and facilitate fabrication, assembly, and maintenance.

DETAILED DESCRIPTION

As is set forth in greater detail below, implementations of the present disclosure are directed to an aerial vehicle airframe design that may reduce weight, complexity, and cost, while also improving stiffness, fabrication, assembly, and maintenance of the aerial vehicle.

In example embodiments, the airframe or frame of the aerial vehicle may comprise a plurality of bonded components, including struts, bulkheads, a tail section, wing sections, brackets or joints, and/or motor mounts. The bonded frame or assembly may reduce the number of components included in the frame, thereby also reducing weight and cost of the frame. Further, the bonded frame or assembly may improve the stiffness of the frame as a whole.

In addition, the airframe or frame of the aerial vehicle may comprise a plurality of assembled components, including a forward fuselage, motors, propellers, motor pod fairings, stabilizer fins, and/or landing gear. Further, the forward fuselage and/or other portions of the frame may comprise a plurality of assembled components, such as processors, controllers, avionics, electronics, sensors, power supplies, antenna, package delivery systems, packages, or other subsystems or components. The assembled components may be removable and/or replaceable to facilitate assembly and/or maintenance of the aerial vehicle.

In this manner, the bonded frame or assembly may provide a lightweight, cost-effective, and robust structural frame of the aerial vehicle. Moreover, the assembled components may be designed or configured to improve assembly and/or maintenance of the aerial vehicle.

Figure 1A:
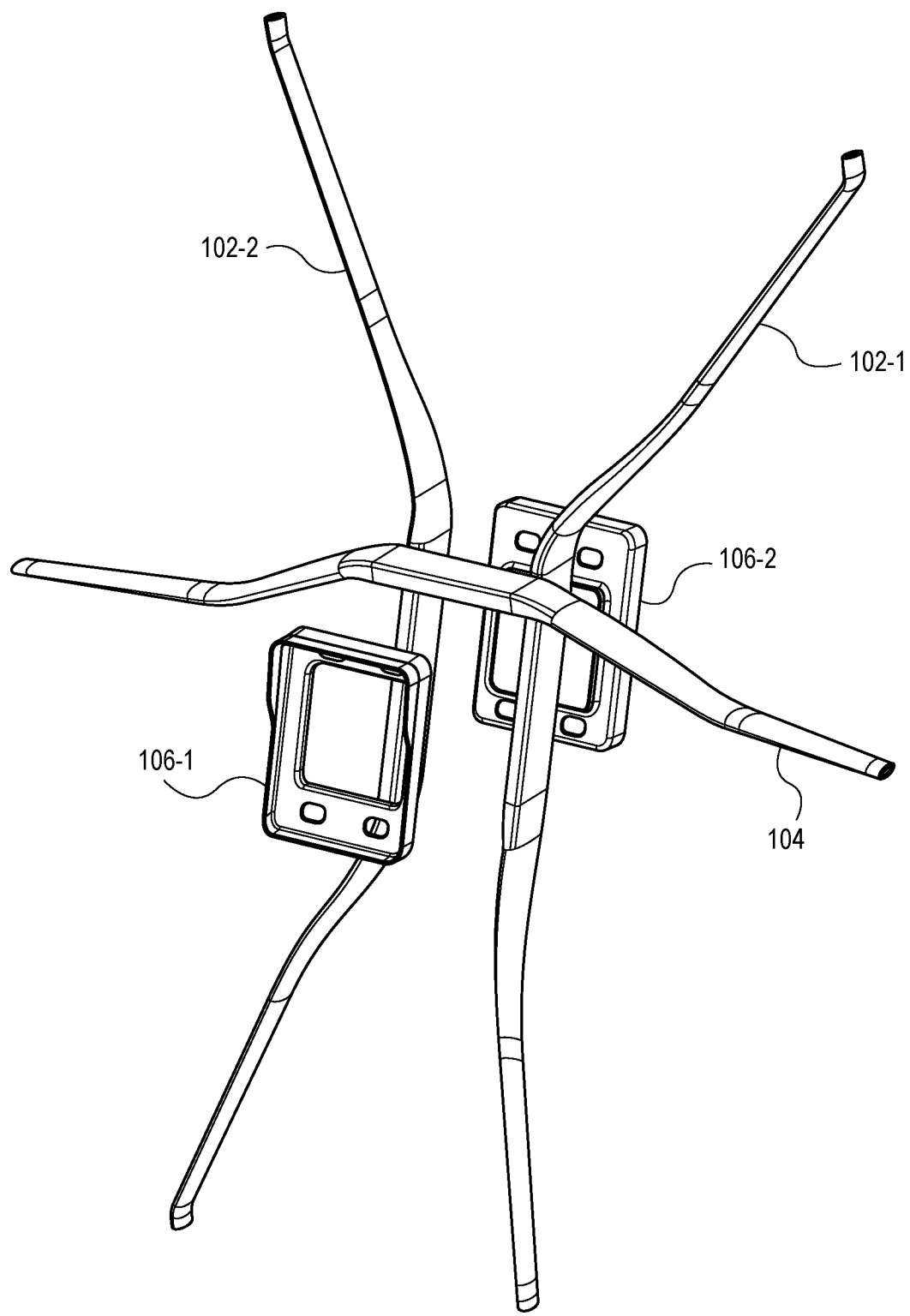
FIG. 1A is a schematic, expanded, front perspective view diagram of example struts and central bulkheads of an airframe design, in accordance with implementations of the present disclosure.
Figure 1B:
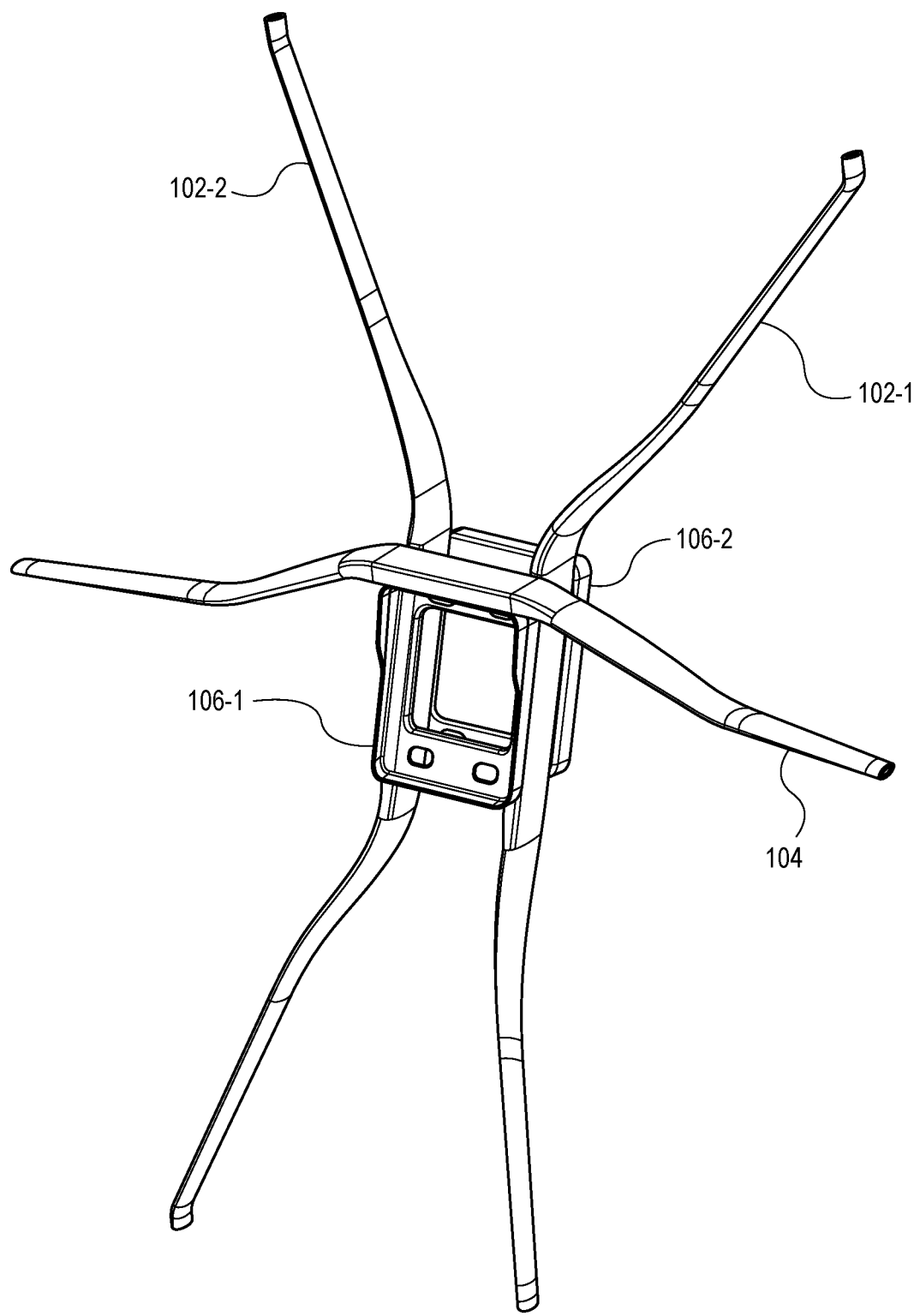
FIG. 1B is a schematic, bonded, front perspective view diagram of example struts and central bulkheads of an airframe design, in accordance with implementations of the present disclosure.

FIG. 1A is a schematic, expanded, front perspective view diagram of example struts and central bulkheads of an airframe design, in accordance with implementations of the present disclosure. FIG. 1B is a schematic, bonded, front perspective view diagram of example struts and central bulkheads of an airframe design, in accordance with implementations of the present disclosure.

The airframe design may include two vertical struts 102-1, 102-2 and one horizontal strut 104. The struts 102, 104 may extend substantially across an entire respective dimension, e.g., length, width, height, etc., of the aerial vehicle. Because the struts 102, 104 may each comprise a single continuous structure, the struts 102, 104 may not have any intervening joints or interfaces between disparate portions or sections of each strut, thereby increasing or improving stiffness associated with each of the struts 102, 104.

The shapes of each strut 102, 104 may be formed to increase or improve stiffness and load distribution across the airframe. For example, each strut 102, 104 may be shaped or formed to position respective motor mounts, motors, and propellers at particular positions and orientations relative to the airframe. In addition, each strut 102, 104 may be shaped or formed to intersect and bond with respective wing sections at particular positions and orientations relative to the airframe.

Further, each strut 102, 104 may have a substantially box-shaped cross-section toward a center of the airframe, e.g., proximate to the central bulkheads as further described herein. In addition, each strut 102, 104 may have an airfoil cross-section, or modified airfoil cross-section, at other portions of the airframe, e.g., away from the central bulkheads. A modified airfoil cross-section may be substantially similar to a standard airfoil cross-section, except that a trailing edge of the standard airfoil cross-section may be removed or cut off for the modified airfoil cross-section. In some example embodiments, a separate tail section or trailing edge may be bonded or fastened to the modified airfoil cross-section, in which the separate tail section or trailing edge may constitute a conduit for power and/or data communication lines or wires. Moreover, various aspects of the airfoil cross-section, or modified airfoil cross-section, may be determined based on the desired lift, moments, or other forces generated by portions of the struts 102, 104 during flight, such as chord length, thickness, camber, leading edge, trailing edge, or other aspects of airfoil or modified airfoil cross-sections.

The struts 102, 104 may be formed of various materials, such as carbon fiber, composites, aluminum, other metals, plastics, other materials, or combinations thereof. In example embodiments, the struts 102, 104 may preferably be formed of carbon fiber or other composites, e.g., using one or more plies of carbon fiber or other composites.

The central bulkheads 106 may comprise a forward central bulkhead 106-1 and an aft central bulkhead 106-2. The forward central bulkhead 106-1 may be positioned relatively closer to a forward flight direction of the aerial vehicle in a horizontal flight configuration, and the aft central bulkhead 106-2 may be positioned relatively farther from a forward flight direction of the aerial vehicle in a horizontal flight configuration.

The central bulkheads 106 may be shaped as substantially flat plates and may include flanges along one or more edges that are configured to contact and bond with other portions of the airframe design, e.g., with portions of the struts 102, 104 and/or a tail section as further described herein. In addition, the forward central bulkhead 106-1 may include various holes, slots, fasteners, nuts, or other attachment elements configured to facilitate removable coupling of a forward fuselage and/or various attachable components as further described herein. Further, the aft central bulkhead 106-2 may include various holes, slots, fasteners, nuts, or other attachment elements configured to facilitate removable coupling of various attachable components at least partially within the tail section as further described herein. The various attachable components may include processors, controllers, avionics, electronics, sensors, power supplies, antenna, package delivery systems, packages, or other subsystems or components.

The central bulkheads 106 may be formed of various materials, such as carbon fiber, composites, aluminum, other metals, plastics, other materials, or combinations thereof. In example embodiments, the central bulkheads 106 may preferably be formed of carbon fiber or other composites, e.g., using one or more plies of carbon fiber or other composites.

As shown in FIG. 1B, the struts 102, 104 and central bulkheads 106 may be bonded together, e.g., using film adhesive, paste adhesive, or other types of adhesives, to form a portion of the airframe.

For example, the vertical struts 102-1, 102-2 may each be bonded to the horizontal strut 104, such as at interfaces proximate and above the central bulkheads 106. In addition, the forward central bulkhead 106-1 may be bonded to forward surfaces of the box-shaped portions of each of the vertical struts 102-1, 102-2, and may be bonded to an underside of the box-shaped portion of the horizontal strut 104. Further, the aft central bulkhead 106-2 may be bonded to rearward surfaces of the box-shaped portions of each of the vertical struts 102-1, 102-2.

In this manner, the bonded struts 102, 104 and central bulkheads 106 may form a portion of the overall structure of the airframe design.

Figure 1C:
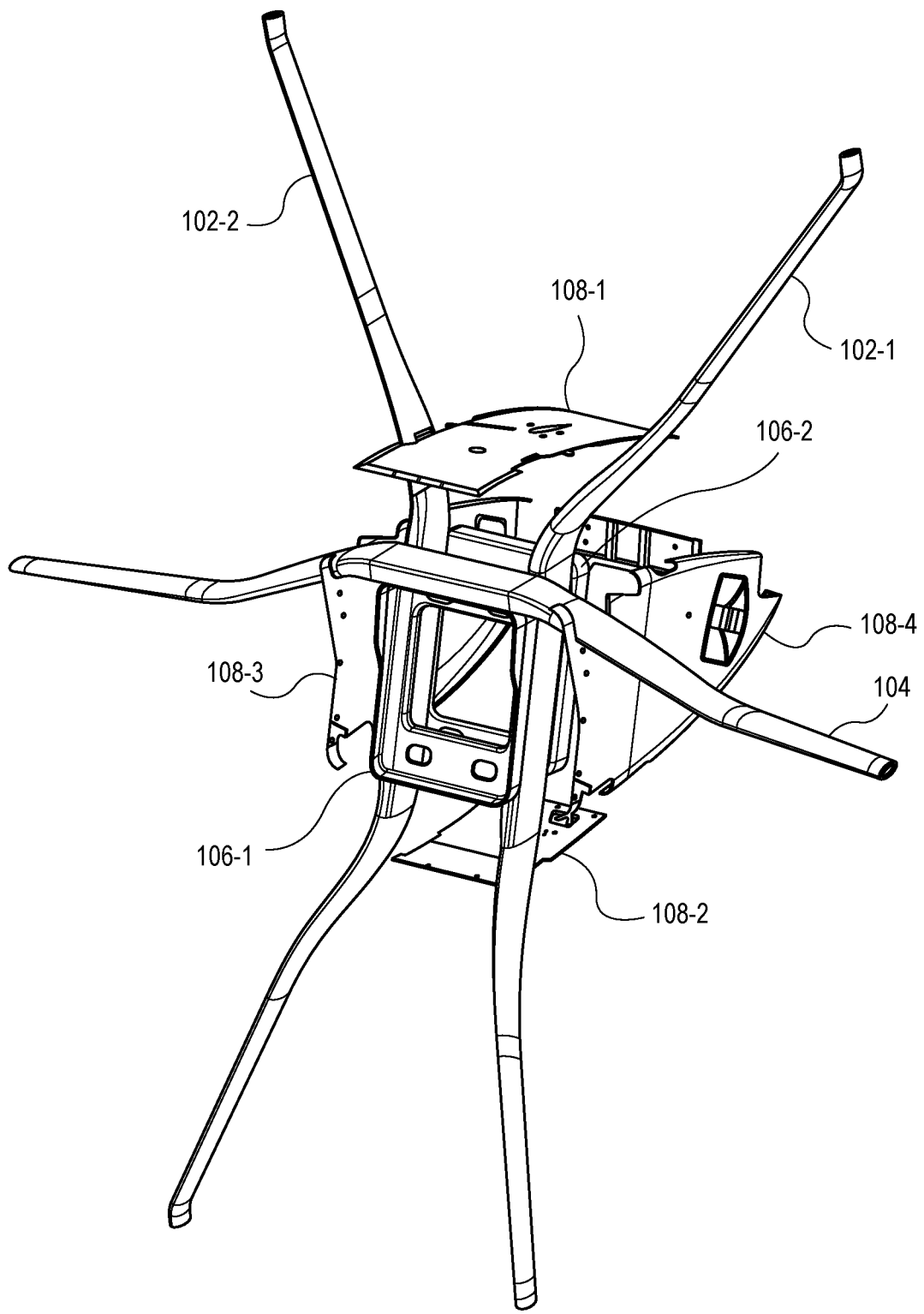
FIG. 1C is a schematic, expanded, front perspective view diagram of an example tail section of an airframe design, in accordance with implementations of the present disclosure.
Figure 1D:
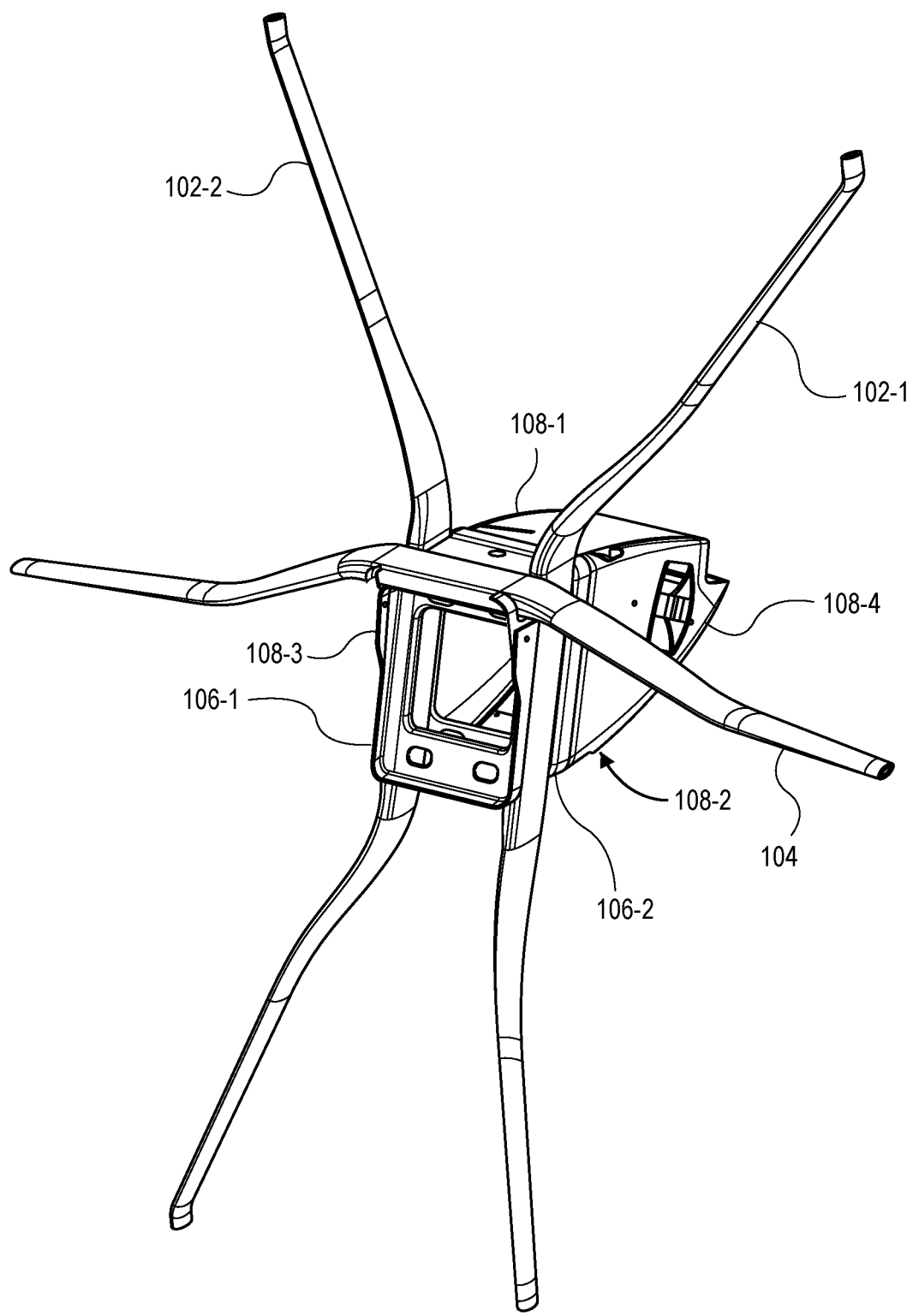
FIG. 1D is a schematic, bonded, front perspective view diagram of an example tail section of an airframe design, in accordance with implementations of the present disclosure.
Figure 2:
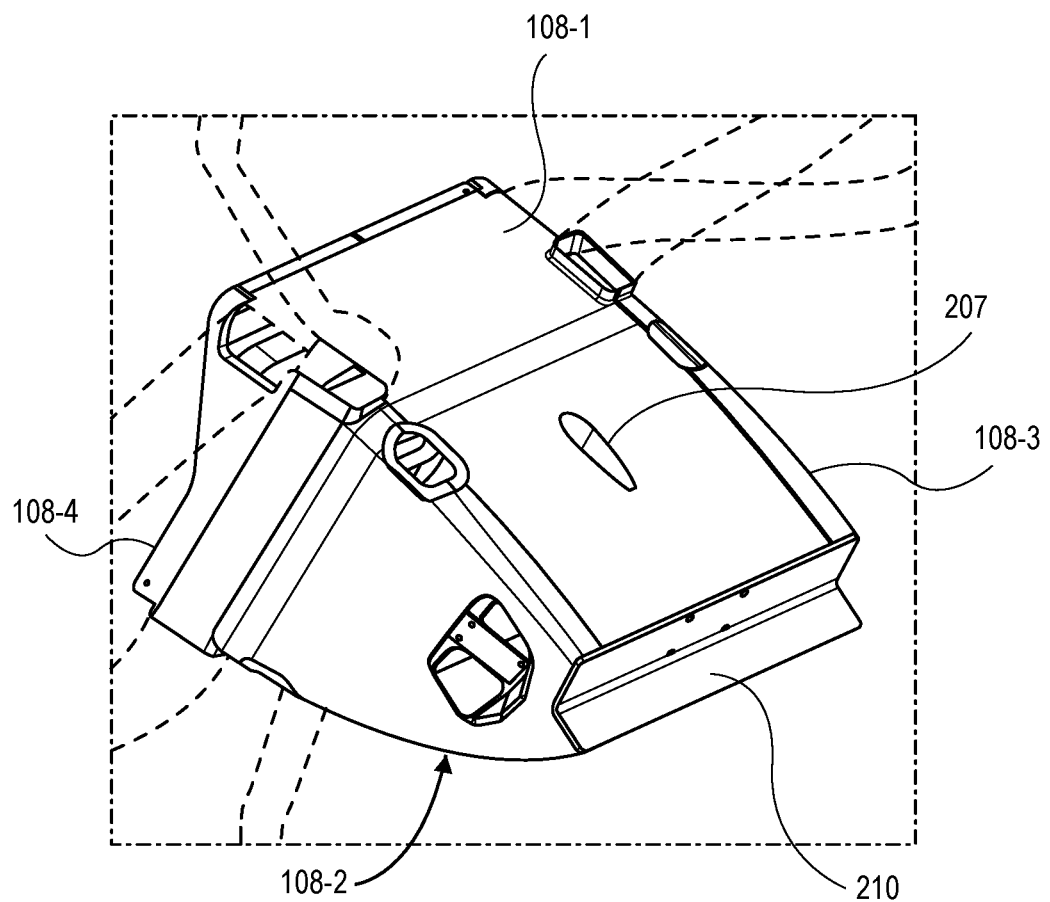
FIG. 2 is a schematic, bonded, rear perspective view diagram of an example tail section of an airframe design, in accordance with implementations of the present disclosure.

FIG. 1C is a schematic, expanded, front perspective view diagram of an example tail section of an airframe design, in accordance with implementations of the present disclosure. FIG. 1D is a schematic, bonded, front perspective view diagram of an example tail section of an airframe design, in accordance with implementations of the present disclosure. FIG. 2 is a schematic, bonded, rear perspective view diagram of an example tail section of an airframe design, in accordance with implementations of the present disclosure.

The tail section may comprise a plurality of tail section panels 108, including an upper tail section panel 108-1, a lower tail section panel 108-2, and two side tail section panels 108-3, 108-4, as well as a tail section bulkhead 210, as shown in FIG. 2. The plurality of tail section panels 108 may contact and bond with portions of the struts 102, 104 and bulkheads 106 and may extend substantially away from a forward flight direction and toward a rear of the aerial vehicle in a horizontal flight configuration.

The plurality of tail section panels 108 may be shaped as substantially flat and/or partially curved plates and may include flanges along one or more edges that are configured to contact and bond with other portions of the airframe design, e.g., with portions of the struts 102, 104, the central bulkheads 106, and/or portions of adjacent tail section panels 108 as further described herein. In addition, the tail section bulkhead 210 may be shaped as a substantially elongated beam or bracket that extends left-to-right relative to a forward flight direction of the aerial vehicle in a horizontal flight configuration.

Further, the plurality of tail section panels 108 and the tail section bulkhead 210 may include various holes, slots, fasteners, nuts, or other attachment elements configured to facilitate removable coupling of various attachable components as further described herein. For example, as shown in FIG. 2, the upper tail section panel 108-1 may include a slot or hole 207 to provide a floating connection for a vertical stabilizer as further described herein. The various attachable components may include processors, controllers, avionics, electronics, sensors, imaging devices, power supplies, antenna, package delivery systems, packages, elastomeric dampers, or other subsystems or components.

The plurality of tail section panels 108 and the tail section bulkhead 210 may be formed of various materials, such as carbon fiber, composites, aluminum, other metals, plastics, other materials, or combinations thereof. In example embodiments, the plurality of tail section panels 108 may preferably be formed of carbon fiber or other composites, e.g., using one or more plies of carbon fiber or other composites, and the tail section bulkhead 210 may preferably be formed of aluminum or other metals.

As shown in FIGS. 1D and 2, the plurality of tail section panels 108 and the tail section bulkhead 210 may be bonded together with portions of the struts 102, 104, the central bulkhead 106, and/or portions of adjacent tail section panels 108, e.g., using film adhesive, paste adhesive, or other types of adhesives, to form a portion of the airframe.

For example, the upper tail section panel 108-1 may be bonded to a portion of the horizontal strut 104, such as an upper surface or rearward surface of the box-shaped portion of the horizontal strut 104. In addition, the upper tail section panel 108-1 may be bonded to portions of the vertical struts 102, such as inner surfaces of the box-shaped portions of each of the vertical struts 102. Further, the upper tail section panel 108-1 may be bonded to upper surfaces of the central bulkheads 106, and may be bonded to portions of the two side tail section panels 108-3, 108-4.

The lower tail section panel 108-2 may be bonded to portions of the vertical struts 102, such as inner surfaces of the box-shaped portions of each of the vertical struts 102. In addition, the lower tail section panel 108-2 may be bonded to lower surfaces of the central bulkheads 106, and may be bonded to portions of the two side tail section panels 108-3, 108-4.

The two side tail section panels 108-3, 108-4 may be bonded to a portion of the horizontal strut 104, such as a lower surface or rearward surface of the box-shaped portion of the horizontal strut 104. In addition, the two side tail section panels 108-3, 108-4 may be bonded to portions of the vertical struts 102, such as outer surfaces of the box-shaped portions of each of the vertical struts 102. Further, the two side tail section panels 108-3, 108-4 may be bonded to outer surfaces of the central bulkheads 106, and may be bonded to portions of the upper and lower tail section panels 108-1, 108-2.

Further, as shown in FIG. 2, the tail section bulkhead 210 may be bonded to portions or flanges of the upper tail section panel 108-1, the lower tail section panel 108-2, and/or the two side tail section panels 108-3, 108-4.

In this manner, the bonded tail section panels 108 and tail section bulkhead 210 may form the structure, e.g., similar to a bonded uni-body structure or exoskeleton, for the tail section. Further, the bonded struts 102, 104, central bulkheads 106, plurality of tail section panels 108, and tail section bulkhead 210 may form a portion of the overall structure of the airframe design.

In an alternative example embodiment, one or more portions of the tail section, including one or more of the plurality of tail section panels 108 and/or the tail section bulkhead 210, may be integrally formed with one or more of the central bulkheads, including the forward central bulkhead and/or the aft central bulkhead. With the integral formation of one or more portions of the tail section with one or more of the central bulkheads, the number of parts of the bonded frame or assembly may be further reduced, thereby reducing complexity, cost, and weight, while also improving strength and stiffness of the overall structure of the airframe design.

Figure 3A:
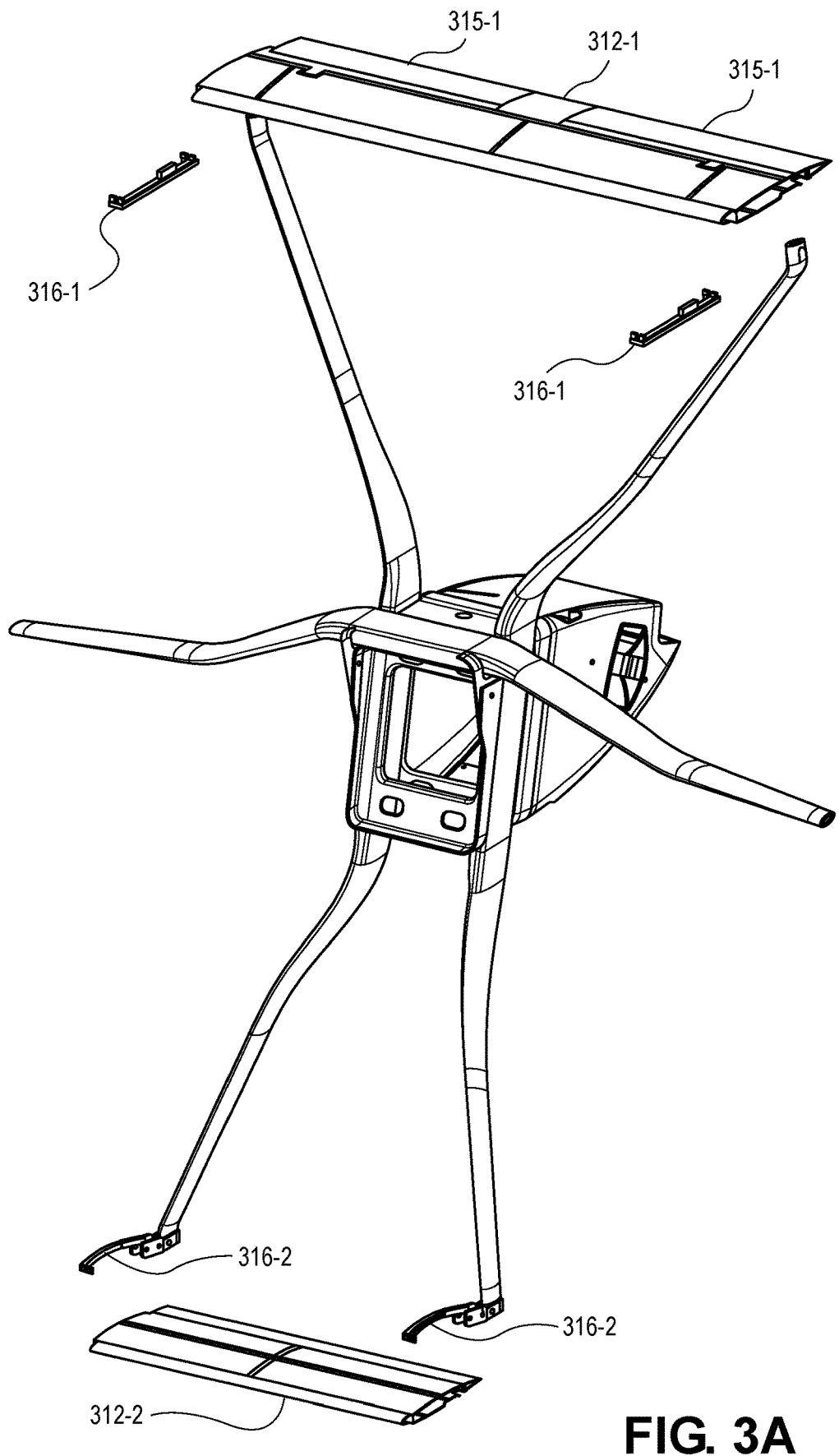
FIG. 3A is a schematic, expanded, front perspective view diagram of example upper and lower wing sections and brackets of an airframe design, in accordance with implementations of the present disclosure.
Figure 3B:
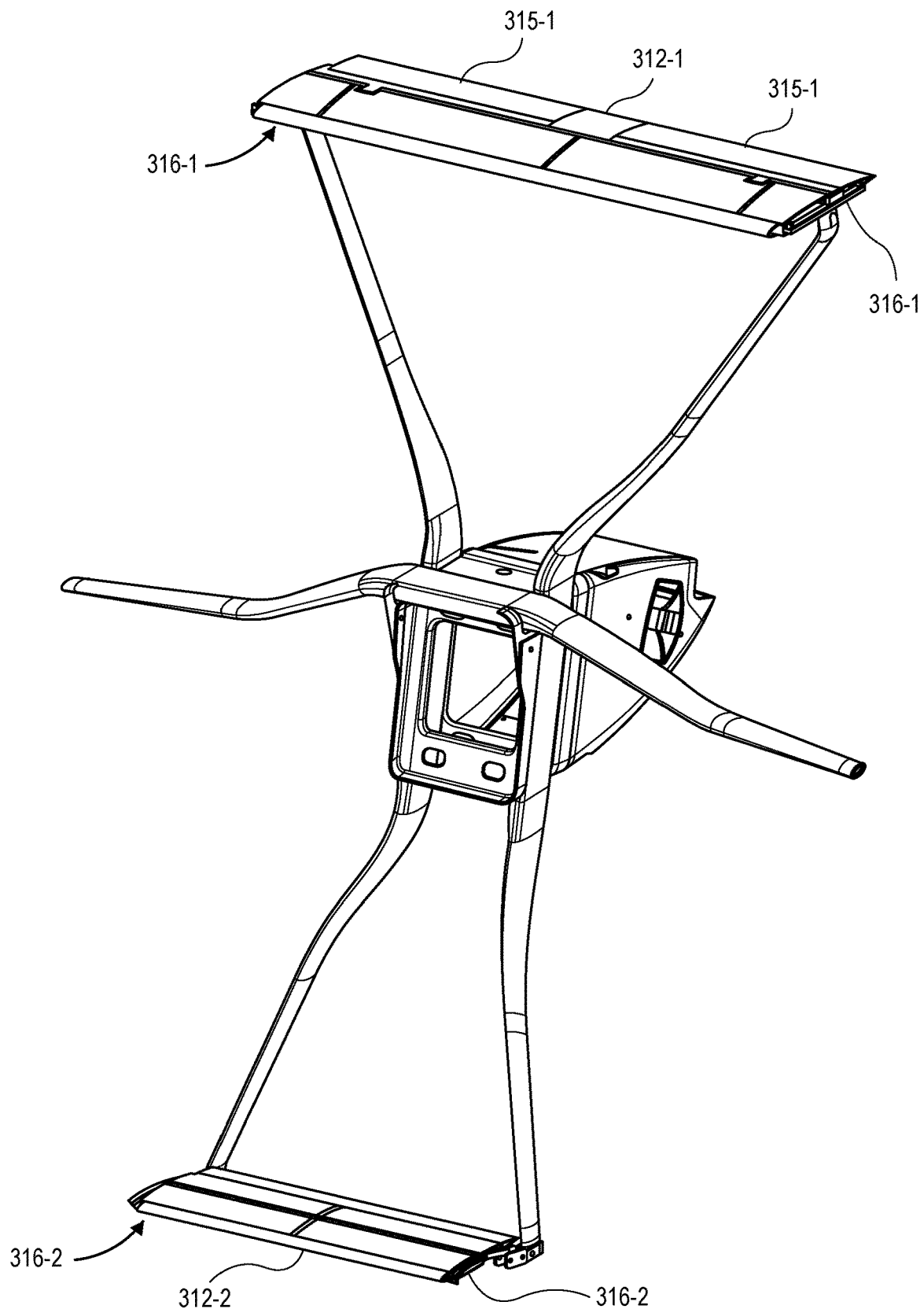
FIG. 3B is a schematic, bonded, front perspective view diagram of example upper and lower wing sections and brackets of an airframe design, in accordance with implementations of the present disclosure.

FIG. 3A is a schematic, expanded, front perspective view diagram of example upper and lower wing sections and brackets of an airframe design, in accordance with implementations of the present disclosure. FIG. 3B is a schematic, bonded, front perspective view diagram of example upper and lower wing sections and brackets of an airframe design, in accordance with implementations of the present disclosure.

Figure 5A:
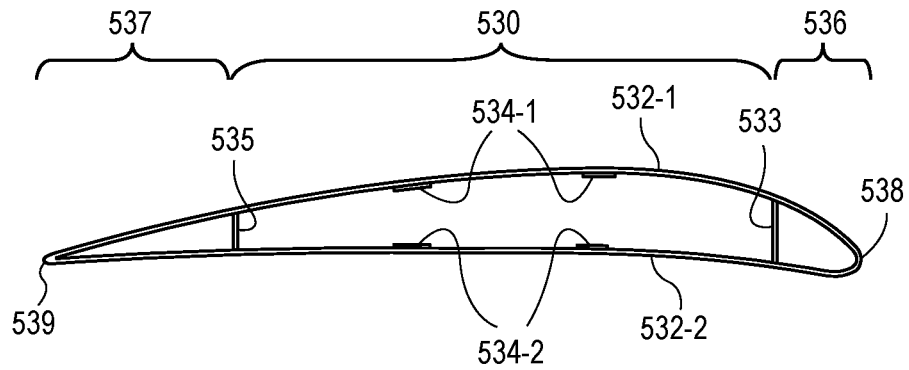
FIG. 5A is a schematic, cross-sectional view diagram of an example wing section of an airframe design, in accordance with implementations of the present disclosure.
Figure 5B:
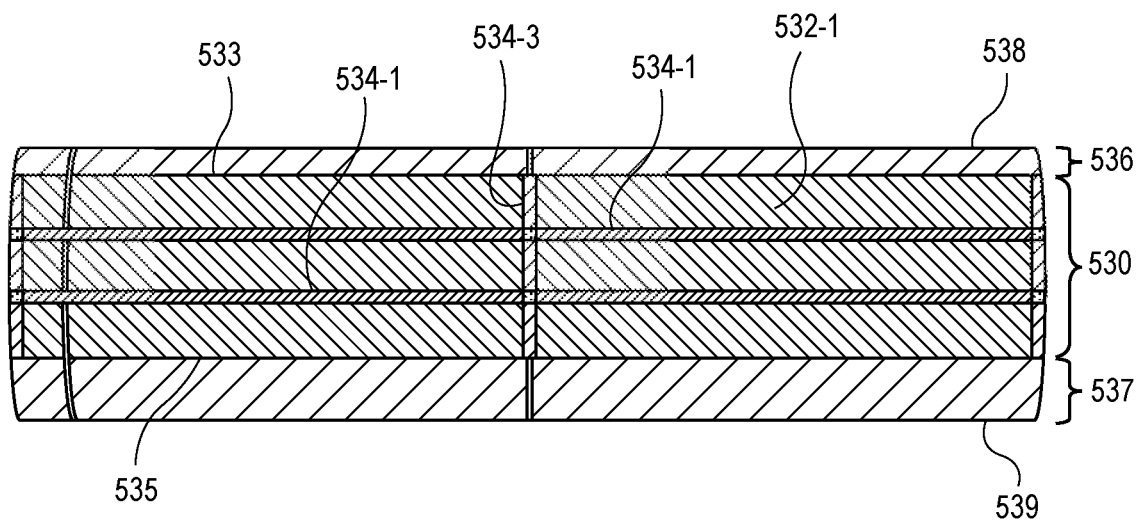
FIG. 5B is a schematic, plan view diagram of an example wing section of an airframe design, in accordance with implementations of the present disclosure.

The upper and lower wing sections 312-1, 312-2 may comprise a wing box, a leading edge section, and a trailing edge section as further described herein at least with respect to FIGS. 5A and 5B. The upper and lower wing sections 312-1, 312-2 may have airfoil cross-sections and may be shaped as substantially straight or flat wing sections that extend between first, upper ends of the vertical struts 102 for the upper wing section 312-1, or between second, lower ends of the vertical struts 102 for the lower wing section 312-2. The upper and lower wing sections 312-1, 312-2 may extend substantially left-to-right relative to a forward flight direction of the aerial vehicle in a horizontal flight configuration.

Ends of the upper and lower wing sections 312-1, 312-2 may include flanges configured to contact and bond with other portions of the airframe design, e.g., with portions of the struts 102 and/or portions of upper or lower side wing sections as further described herein, via one or more brackets or joints 316-1, 316-2. In addition, the upper wing section 312-1 may include one or more, e.g., two, control surfaces 315-1 such as elevators having associated actuators, e.g., servos, solenoids, or other actuators.

Further, the upper and lower wing sections 312-1, 312-2 may include various holes, slots, fasteners, nuts, or other attachment elements configured to facilitate removable coupling of various attachable components as further described herein. The various attachable components may include processors, controllers, avionics, electronics, sensors, magnetometers, imaging devices, antenna, global positioning system (GPS) antenna, landing gear, or other subsystems or components.

The upper and lower wing sections 312-1, 312-2 may be formed of various materials, such as carbon fiber, composites, aluminum, other metals, plastics, other materials, or combinations thereof. In example embodiments, the upper and lower wing sections 312-1, 312-2 may preferably be formed of carbon fiber or other composites, e.g., using one or more plies of carbon fiber or other composites as further described herein at least with respect to FIGS. 5A and 5B.

As shown in FIG. 3B, the upper and lower wing sections 312-1, 312-2 may be bonded together with portions of the struts 102 and/or portions of upper and lower side wing sections, e.g., using film adhesive, paste adhesive, or other types of adhesives, to form a portion of the airframe.

Figure 4A:
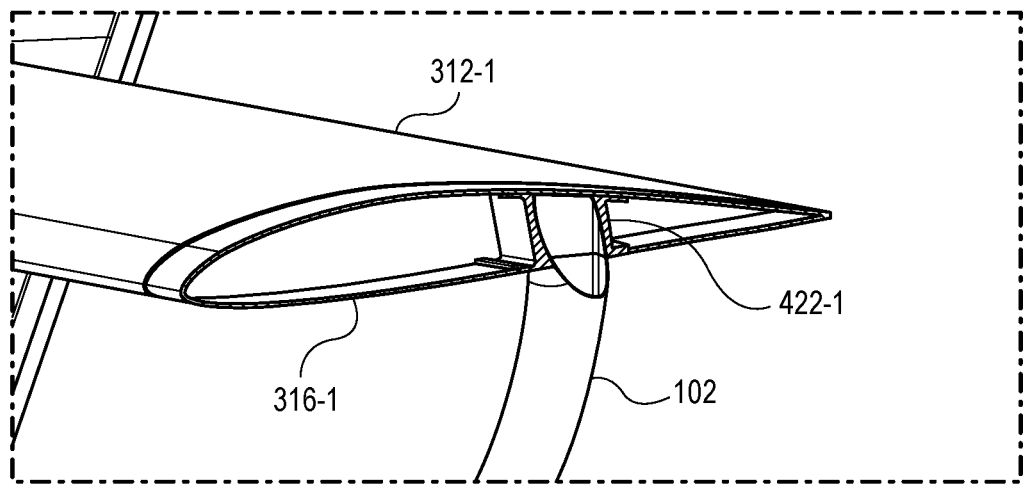
FIG. 4A is a schematic, bonded, front cutaway perspective view diagram of an example upper wing section and bracket of an airframe design, in accordance with implementations of the present disclosure.

For example, the upper wing section 312-1 may contact and bond with first, upper ends of the vertical struts 102 via brackets or joints 316-1 as further described herein at least with respect to FIG. 4A. Opposite ends of the upper wing section 312-1 may bond with respective brackets 316-1, and the first, upper ends of the vertical struts 102 may also bond with respective brackets 316-1, thereby bonding the upper wing section 312-1 together with the vertical struts 102.

Figure 4B:
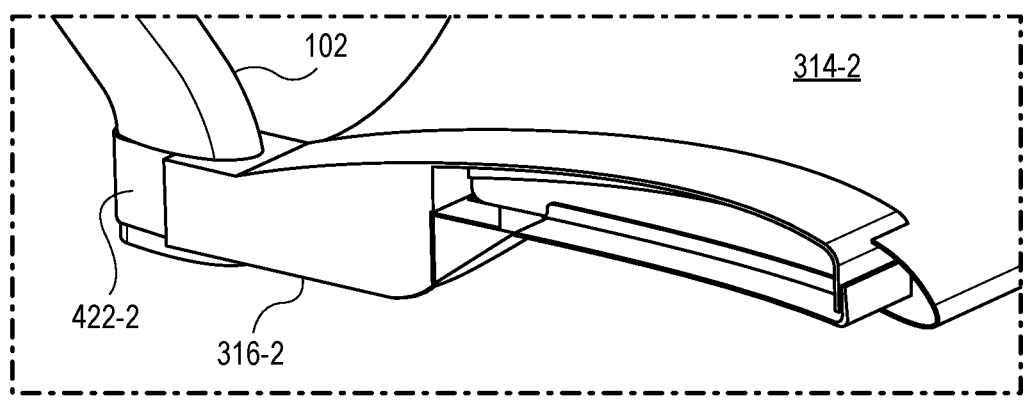
FIG. 4B is a schematic, bonded, front cutaway perspective view diagram of an example lower side wing section and bracket of an airframe design, in accordance with implementations of the present disclosure.

The lower wing section 312-2 may contact and bond with second, lower ends of the vertical struts 102 via brackets or joints 316-2 as further described herein at least with respect to FIG. 4B. Opposite ends of the lower wing section 312-2 may bond with respective brackets 316-2, and the second, lower ends of the vertical struts 102 may also bond with respective brackets 316-2, thereby bonding the lower wing section 312-2 together with the vertical struts 102.

In this manner, the bonded struts 102, 104, central bulkheads 106, plurality of tail section panels 108, tail section bulkhead 210, and upper and lower wing sections 312-1, 312-2 may form a portion of the overall structure of the airframe design.

Figure 3C:
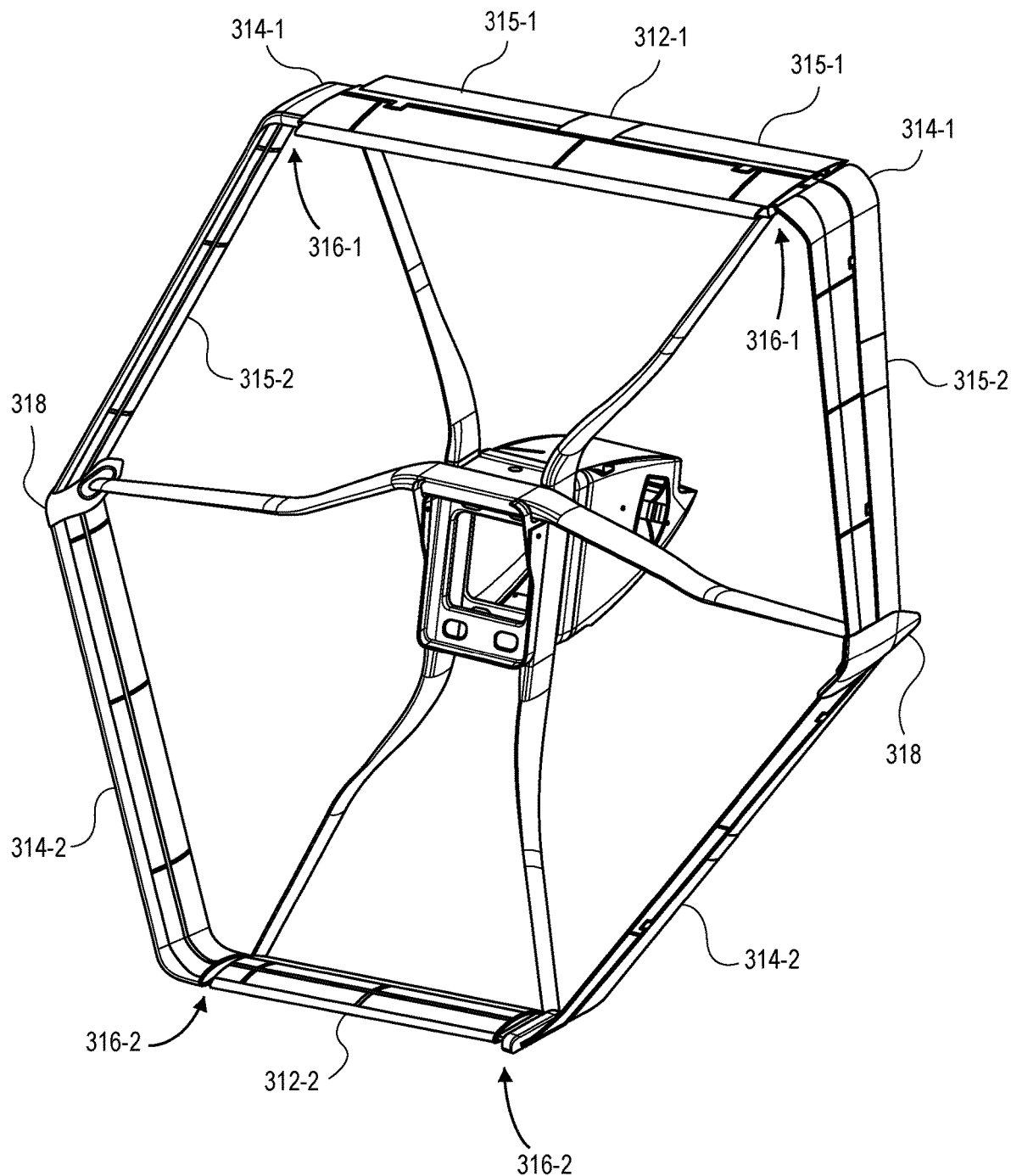
FIG. 3C is a schematic, bonded, front perspective view diagram of example upper and lower side wing sections and brackets of an airframe design, in accordance with implementations of the present disclosure.

FIG. 3C is a schematic, bonded, front perspective view diagram of example upper and lower side wing sections and brackets of an airframe design, in accordance with implementations of the present disclosure.

The upper side and lower side wing sections 314-1, 314-2 may comprise a wing box, a leading edge section, and a trailing edge section as further described herein at least with respect to FIGS. 5A and 5B. The upper side and lower side wing sections 314-1, 314-2 may have airfoil cross-sections and may be shaped as substantially straight or flat wing sections with curved sections at one end, e.g., similar to a hockey stick shape, that extend between first, upper ends of the vertical struts 102 and an end of the horizontal strut 104 for the upper side wing section 314-1, or between second, lower ends of the vertical struts 102 and an end of the horizontal strut 104 for the lower side wing section 314-2. The upper and lower side wing sections 314-1, 314-2 may extend substantially vertically and at respective angles relative to a forward flight direction of the aerial vehicle in a horizontal flight configuration.

The curved sections of the upper and lower side wing sections 314-1, 314-2 may facilitate bonding or joining of upper and lower side wing sections 314-1, 314-2 to upper and lower wing sections 312-1, 312-2 along substantially straight or flat portions, e.g., at positions proximate the upper brackets 316-1 or at positions proximate the lower brackets 316-2. This may reduce the complexity, weight, and cost associated with designs or configurations having joints between wing sections that are positioned at or along curved or angled portions.

Ends of the upper and lower side wing sections 314-1, 314-2 may include flanges configured to contact and bond with other portions of the airframe design, e.g., with portions of the struts 102, 104 and/or portions of upper or lower wing sections 312-1, 312-2 as further described herein, via one or more brackets or joints 316-1, 316-2, 318. In addition, the upper side wing sections 314-1 may each include one or more, e.g., one, control surface 315-2 such as a rudder/elevator having an associated actuator, e.g., a servo, solenoid, or other actuator.

Further, the upper and lower side wing sections 314-1, 314-2 may include various holes, slots, fasteners, nuts, or other attachment elements configured to facilitate removable coupling of various attachable components as further described herein. The various attachable components may include processors, controllers, avionics, electronics, sensors, magnetometers, imaging devices, antenna, global positioning system (GPS) antenna, or other subsystems or components.

The upper and lower side wing sections 314-1, 314-2 may be formed of various materials, such as carbon fiber, composites, aluminum, other metals, plastics, other materials, or combinations thereof. In example embodiments, the upper and lower side wing sections 314-1, 314-2 may preferably be formed of carbon fiber or other composites, e.g., using one or more plies of carbon fiber or other composites as further described herein at least with respect to FIGS. 5A and 5B.

As shown in FIG. 3C, the upper and lower side wing sections 314-1, 314-2 may be bonded together with portions of the struts 102, 104 and/or portions of upper and lower wing sections, e.g., using film adhesive, paste adhesive, or other types of adhesives, to form a portion of the airframe.

For example, each upper side wing section 314-1 may contact and bond with a first, upper end of a vertical strut 102 via a bracket or joint 316-1 that is also bonded to an upper wing section 312-1 as further described herein at least with respect to FIG. 4A. In addition, each upper side wing section 314-1 may also contact and bond with an end of the horizontal strut 104 via a bracket or joint 318 that is also bonded to a lower side wing section 314-2 as further described herein at least with respect to FIGS. 4C and 4D.

Each lower side wing section 314-2 may contact and bond with a second, lower end of a vertical strut 102 via a bracket or joint 316-2 that is also bonded to a lower wing section 312-2 as further described herein at least with respect to FIG. 4B. In addition, each lower side wing section 314-2 may also contact and bond with an end of the horizontal strut 104 via a bracket or joint 318 that is also bonded to an upper side wing section 314-1 as further described herein at least with respect to FIGS. 4C and 4D.

In this manner, the bonded struts 102, 104, central bulkheads 106, plurality of tail section panels 108, tail section bulkhead 210, upper and lower wing sections 312-1, 312-2, and upper and lower side wing sections 314-1, 314-2 may substantially form the overall structure of the airframe design, e.g., the bonded frame or assembly.

FIG. 4A is a schematic, bonded, front cutaway perspective view diagram of an example upper wing section and bracket of an airframe design, in accordance with implementations of the present disclosure.

The upper brackets 316-1 may have airfoil cross-sections substantially similar to respective airfoil cross-sections of the upper wing section 312-1 and upper side wing sections 314-1 to which they are bonded, thereby providing substantially continuous and smooth surfaces therebetween. Ends of the upper wing section 312-1 and upper side wing sections 314-1 may include flanges configured to contact and bond with the upper brackets 316-1. For example, the upper brackets 316-1 may be at least partially inserted into each of the upper wing section 312-1 and the upper side wing sections 314-1 to facilitate bonding. In addition, the upper brackets 316-1 may include channels 422-1 into which first, upper ends of the vertical struts 102 may be inserted to facilitate bonding.

Further, the upper brackets 316-1 may include various holes, slots, fasteners, nuts, or other attachment elements configured to facilitate removable coupling of various attachable components as further described herein. The various attachable components may include processors, controllers, avionics, electronics, sensors, magnetometers, imaging devices, antenna, global positioning system (GPS) antenna, or other subsystems or components.

The upper brackets 316-1 may be formed of various materials, such as carbon fiber, composites, aluminum, other metals, plastics, other materials, or combinations thereof. In example embodiments, the upper brackets 316-1 may preferably be formed of carbon fiber, other composites, e.g., using one or more plies of carbon fiber or other composites, aluminum, or other metals.

As shown in FIG. 4A, the upper wing section 312-1, an upper side wing section 314-1 (not illustrated), and a vertical strut 102 may be bonded together via an upper bracket 316-1, e.g., using film adhesive, paste adhesive, or other types of adhesives, to form a portion of the airframe.

For example, a first, upper end of a vertical strut 102 may be inserted into and bonded with the channel 422-1 of the upper bracket 316-1. In addition, at least a portion of the upper bracket 316-1 may be inserted into and bonded with an end of the upper wing section 312-1. Further, at least a portion of the upper bracket 316-1 may be inserted into and bonded with an end of the upper side wing section 314-1.

In this manner, the bonded struts 102, upper wing section 312-1, and upper side wing sections 314-1 may form a portion of the overall structure of the airframe design.

FIG. 4B is a schematic, bonded, front cutaway perspective view diagram of an example lower side wing section and bracket of an airframe design, in accordance with implementations of the present disclosure.

The lower brackets 316-2 may have airfoil cross-sections substantially similar to respective airfoil cross-sections of the lower wing section 312-2 and lower side wing sections 314-2 to which they are bonded, thereby providing substantially continuous and smooth surfaces therebetween. Ends of the lower wing section 312-2 and lower side wing sections 314-2 may include flanges configured to contact and bond with the lower brackets 316-2. For example, the lower brackets 316-2 may be at least partially inserted into each of the lower wing section 312-2 and the lower side wing sections 314-2 to facilitate bonding. In addition, the lower brackets 316-2 may include channels 422-2 into which second, lower ends of the vertical struts 102 may be inserted to facilitate bonding.

Further, the lower brackets 316-2 may include various holes, slots, fasteners, nuts, or other attachment elements configured to facilitate removable coupling of various attachable components as further described herein. The various attachable components may include processors, controllers, avionics, electronics, sensors, magnetometers, imaging devices, antenna, global positioning system (GPS) antenna, landing gear, or other subsystems or components.

The lower brackets 316-2 may be formed of various materials, such as carbon fiber, composites, aluminum, other metals, plastics, other materials, or combinations thereof. In example embodiments, the lower brackets 316-2 may preferably be formed of carbon fiber, other composites, e.g., using one or more plies of carbon fiber or other composites, aluminum, or other metals.

As shown in FIG. 4B, the lower wing section 312-2 (not illustrated), a lower side wing section 314-2, and a vertical strut 102 may be bonded together via a lower bracket 316-2, e.g., using film adhesive, paste adhesive, or other types of adhesives, to form a portion of the airframe.

For example, a second, lower end of a vertical strut 102 may be inserted into and bonded with the channel 422-2 of the lower bracket 316-2. In addition, at least a portion of the lower bracket 316-2 may be inserted into and bonded with an end of the lower wing section 312-2. Further, at least a portion of the lower bracket 316-2 may be inserted into and bonded with an end of the lower side wing section 314-2.

In this manner, the bonded struts 102, lower wing section 312-2, and lower side wing sections 314-2 may form a portion of the overall structure of the airframe design.

Figure 4C:
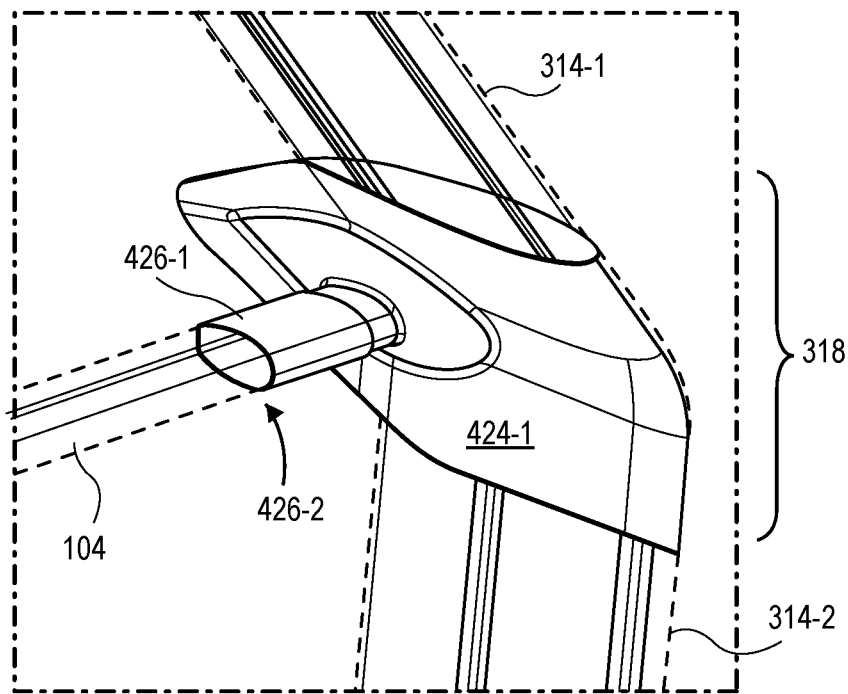
FIG. 4C is a schematic, bonded, front inner perspective view diagram of example upper and lower side wing sections and bracket of an airframe design, in accordance with implementations of the present disclosure.
Figure 4D:
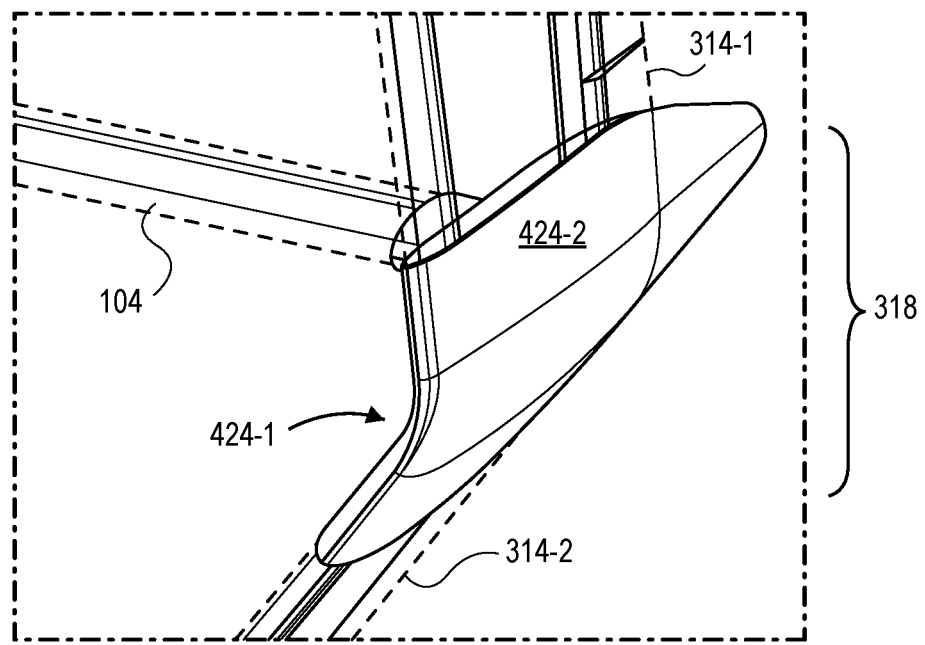
FIG. 4D is a schematic, bonded, front outer perspective view diagram of example upper and lower side wing sections and bracket of an airframe design, in accordance with implementations of the present disclosure.

FIG. 4C is a schematic, bonded, front inner perspective view diagram of example upper and lower side wing sections and bracket of an airframe design, in accordance with implementations of the present disclosure. FIG. 4D is a schematic, bonded, front outer perspective view diagram of example upper and lower side wing sections and bracket of an airframe design, in accordance with implementations of the present disclosure.

The side brackets 318 may include a joint inner 424-1, a joint outer 424-2, an upper collar 426-1, and a lower collar 426-2. The joint inner and outer 424-1, 424-2 may form airfoil cross-sections substantially similar to respective airfoil cross-sections of the upper side wing sections 314-1 and lower side wing sections 314-2 to which they are bonded, thereby providing substantially continuous and smooth surfaces therebetween. Ends of the upper side wing sections 314-1 and lower side wing sections 314-2 may include flanges configured to be inserted between the joint inner and outer 424-1, 424-2 and bonded together. In addition, an end of the horizontal strut 104 may be at least partially inserted into the joint inner 424-1, e.g., through a channel, hole, or flange of the joint inner 424-1, and may be bonded to the joint inner 424-1. Further, the upper and lower collars 426-1, 426-2 may be placed in contact with and bonded to the horizontal strut 104 and at least a portion of the joint inner 424-1. In an alternative example embodiment, the upper and lower collars 426-1, 426-2 may be combined into a single, integral collar that may be placed in contact with and bonded to the horizontal strut 104 and at least a portion of the joint inner 424-1.

Further, the side brackets 318 may include various holes, slots, fasteners, nuts, or other attachment elements configured to facilitate removable coupling of various attachable components as further described herein. The various attachable components may include processors, controllers, avionics, electronics, sensors, magnetometers, imaging devices, antenna, global positioning system (GPS) antenna, or other subsystems or components.

The side brackets 318 may be formed of various materials, such as carbon fiber, composites, aluminum, other metals, plastics, other materials, or combinations thereof. In example embodiments, the side brackets 318 may preferably be formed of carbon fiber, other composites, e.g., using one or more plies of carbon fiber or other composites, aluminum, or other metals.

As shown in FIGS. 4C and 4D, an upper side wing section 314-1, a lower side wing section 314-2, and an end of the horizontal strut 104 may be bonded together via a side bracket 318, e.g., using film adhesive, paste adhesive, or other types of adhesives, to form a portion of the airframe.

For example, the joint inner and outer 424-1, 424-2 may be placed in contact with and bonded to ends of the upper side wing section 314-1 and lower side wing section 314-2. The end of the horizontal strut 104 may be inserted into and bonded to the joint inner 424-1. In addition, upper and lower collars 426-1, 426-2 may be placed in contact with and bonded to the horizontal strut 104 and at least a portion of the joint inner 424-1.

In an alternative example embodiment, the upper and lower collars 426-1, 426-2 may be combined into a single, integral collar that may be placed in contact with and bonded to the horizontal strut 104 and at least a portion of the joint inner 424-1. For example, an end of the horizontal strut 104 may be inserted into a first end of the single, integral collar, and a portion of the joint inner 424-1 may be inserted into a second end of the single, integral collar. In addition, the single, integral collar may be bonded to each of the end of the horizontal strut 104 and the portion of the joint inner 424-1.

In this manner, the bonded strut 104, upper side wing sections 314-1, and lower side wing sections 314-2 may form a portion of the overall structure of the airframe design.

FIG. 5A is a schematic, cross-sectional view diagram of an example wing section of an airframe design, in accordance with implementations of the present disclosure. FIG. 5B is a schematic, plan view diagram of an example wing section of an airframe design, in accordance with implementations of the present disclosure.

Each of the upper wing section 312-1, lower wing section 312-2, upper side wing sections 314-1, and lower side wing sections 314-2 may include a wing box 530, a leading edge section 536, and a trailing edge section 537. The different wing sections described herein may generally have a similar structure and construction as described herein. The various portions of the different wing sections may combine to form overall airfoil cross-sections for each wing section. The various aspects of the airfoil cross-sections, e.g., chord length, thickness, camber, leading edge, trailing edge, or other aspects, of each of the different wing sections may be the same, similar, or different for each of the upper wing section 312-1, lower wing section 312-2, upper side wing sections 314-1, and lower side wing sections 314-2.

The wing box 530 may comprise a substantially hollow box or central section of a wing section that may reduce the weight of the wing section. The substantially hollow wing box 530 may be bounded by an upper skin 532-1, a lower skin 532-2, a front spar 533, and a rear spar 535. The front spar may be positioned at approximately 5-20%, preferably at approximately 10%, of the chord length from the leading edge of the wing section, and the rear spar may be positioned at approximately 60-90%, preferably at approximately 70-75%, of the chord length from the leading edge of the wing section. In addition, the upper and lower skins 532-1, 532-2 of the wing box 530 may include one or more plies of material. Similarly, the front and rear spars 533, 535 of the wing box 530 may also include one or more plies of material.

Further, the upper skin 532-1 of the wing box 530 may include one or more upper stringers 534-1, and the lower skin 532-2 of the wing box 530 may also include one or more lower stringers 534-2. The upper and lower stringers 534-1, 534-2 may comprise strips or lengths of material, e.g., carbon fiber tape, that extend spanwise along the wing section. Moreover, the upper skin 532-1 of the wing box 530 may include one or more upper ribs 534-3, and the lower skin 532-2 of the wing box 530 may also include one or more lower ribs 534-3. The upper and lower ribs 534-3 may comprise strips or lengths of material, e.g., carbon fiber tape, that extend chordwise along the wing section. The one or more upper and lower stringers 534-1, 534-2, as well as the one or more upper and lower ribs 534-3, may provide the substantially hollow wing box 530 with sufficient stiffness and strength to withstand forces during operation.

Each wing section may also comprise a substantially hollow leading edge section 536 and a substantially hollow trailing edge section 537. The leading edge section 536 may be bounded by a leading edge skin 538 that is coupled or bonded to the front spar 533 of the wing box 530. In addition, the trailing edge section 537 may be bounded by a trailing edge skin 539 that is coupled or bonded to the rear spar 535 of the wing box 530. In other example embodiments, the leading edge section 536 and/or the trailing edge section 537 may be substantially filled with foam or other lightweight materials to provide stiffness and strength. Further, the leading and trailing edge skins 538, 539 may include one or more plies of material.

The wing sections, including a wing box 530, a leading edge section 536, a trailing edge section 537, and various components or portions thereof, may be formed of various materials, such as carbon fiber, composites, aluminum, other metals, plastics, other materials, or combinations thereof. In example embodiments, the wing sections may preferably be formed of carbon fiber or other composites, e.g., using one or more plies of carbon fiber or other composites.

In some example embodiments, plies of material associated with upper and lower skins 532-1, 532-2 may be alternatingly laid with strips of upper and lower stringers 534-1, 534-2 and/or with strips of upper and lower ribs 534-3 to further improve or increase stiffness and strength of the wing box 530. In one example construction, one or two plies of an upper skin 532-1 may be laid, then one strip of an upper stringer 534-1 may be laid, and then one strip of an upper rib 534-3 may be laid, and this sequence of construction may be repeated a number of times. Other numbers, combinations, or arrangements of the plies of skins and strips of stringers and/or strips of ribs may also be used to form the wing box 530. Further, the number of plies of skins and the number of strips of stringers and/or ribs may vary between one and approximately six or more plies or strips for any of the different wing sections. Moreover, the number of plies of skins and the number of strips of stringers and/or ribs may vary over a span of a single wing section.

Figure 6A:
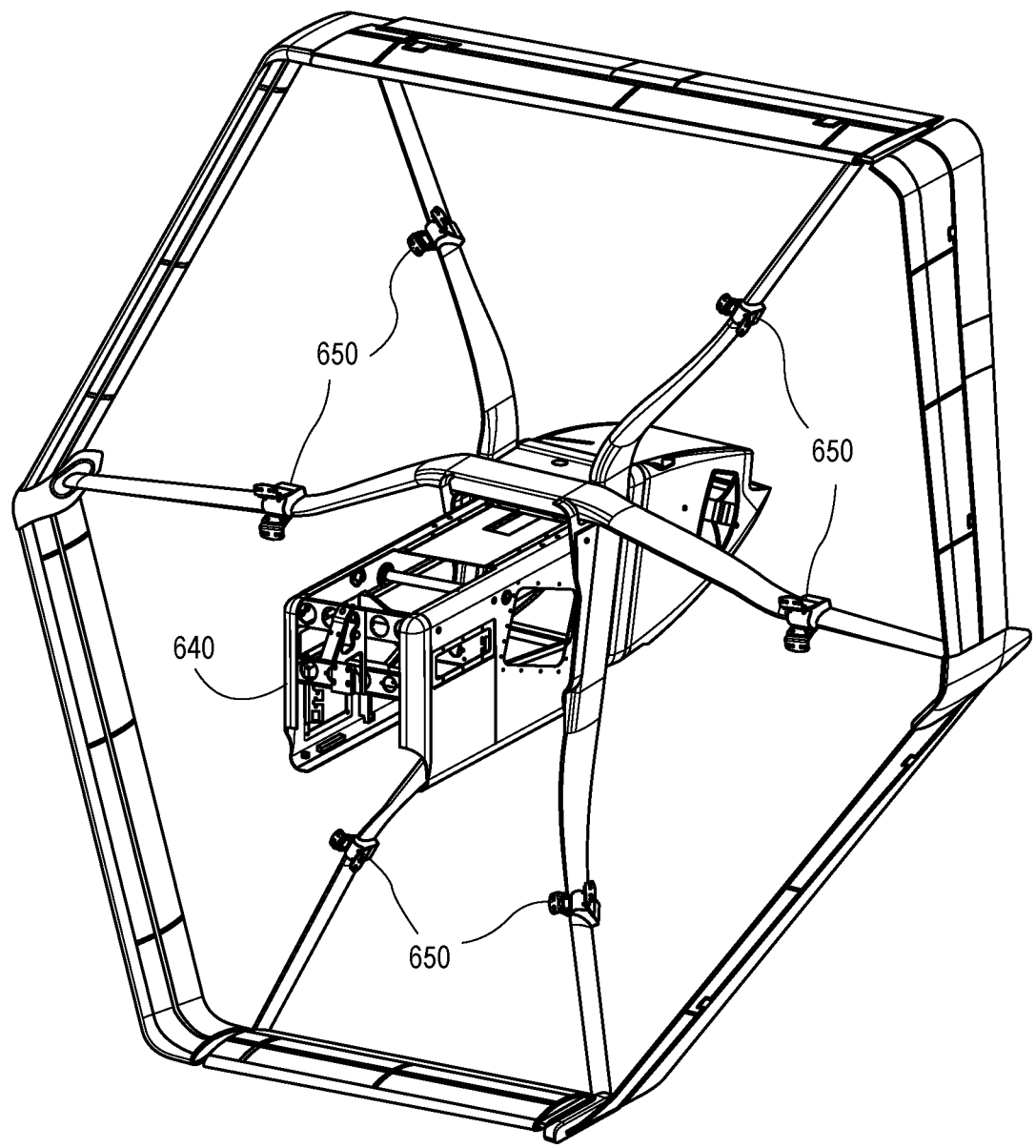
FIG. 6A is a schematic, bonded and assembled, front perspective view diagram of example motor mounts and forward fuselage of an airframe design, in accordance with implementations of the present disclosure.

FIG. 6A is a schematic, bonded and assembled, front perspective view diagram of example motor mounts and forward fuselage of an airframe design, in accordance with implementations of the present disclosure.

Referring back to the bonded struts 102, 104, central bulkheads 106, plurality of tail section panels 108, tail section bulkhead 210, upper and lower wing sections 312-1, 312-2, and upper and lower side wing sections 314-1, 314-2 that may substantially form the overall structure of the airframe design, e.g., the bonded frame or assembly, as illustrated in FIG. 3C, a forward fuselage 640 may be attached to the bonded frame or assembly, e.g., fastened or removably coupled to the forward central bulkhead 106-1 of the bonded frame. In addition, a plurality of motor mounts 650 may be bonded to the struts 102, 104 of the bonded frame or assembly.

The forward fuselage 640 may be removably coupled to the forward central bulkhead extending toward a forward flight direction of the aerial vehicle in a horizontal flight configuration. In addition, the plurality of motor mounts 650 may be bonded to respective portions of the struts 102, 104 generally facing toward a forward flight direction of the aerial vehicle in a horizontal flight configuration.

Figure 6B:
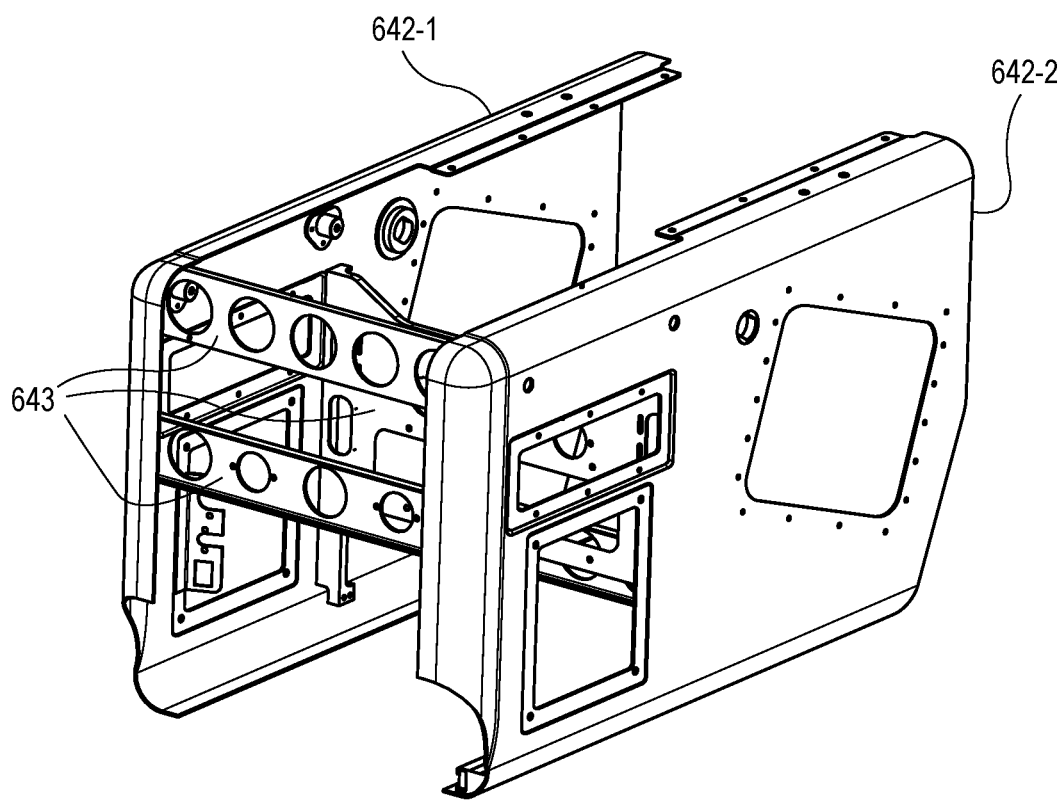
FIG. 6B is a schematic, front perspective view diagram of an example forward fuselage of an airframe design, in accordance with implementations of the present disclosure.
Figure 6C:
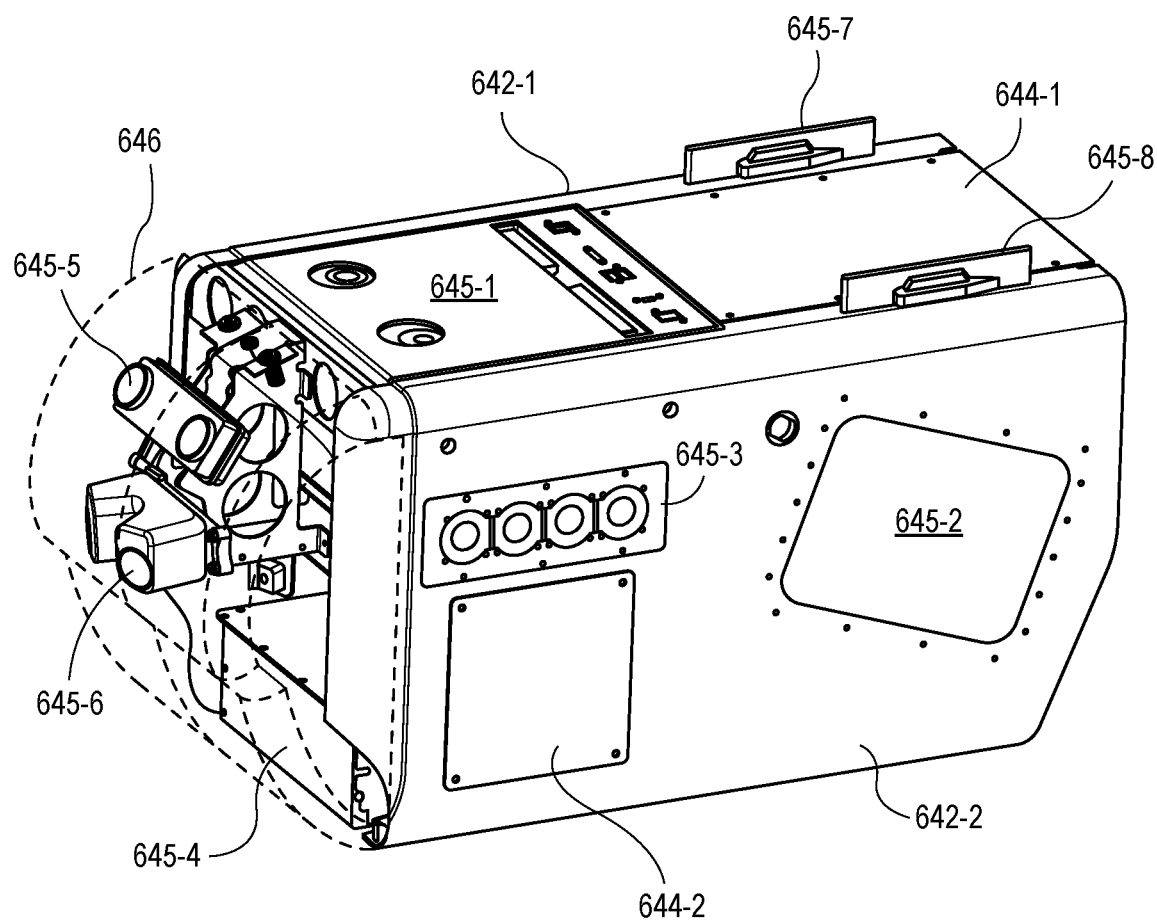
FIG. 6C is a schematic, side perspective view diagram of an example assembled, forward fuselage of an airframe design, in accordance with implementations of the present disclosure.

FIG. 6B is a schematic, front perspective view diagram of an example forward fuselage of an airframe design, in accordance with implementations of the present disclosure. FIG. 6C is a schematic, side perspective view diagram of an example assembled, forward fuselage of an airframe design, in accordance with implementations of the present disclosure.

The forward fuselage 640 may comprise a plurality of forward fuselage panels 642, such as a first side panel 642-1 and a second side panel 642-2, as well as a plurality of structural members 643. The plurality of forward fuselage panels 642 may be coupled, attached, or bonded with each other via the structural members 643. In addition, the plurality of forward fuselage panels 642 may be shaped as substantially flat plates and may include flanges along one or more edges that are configured to couple, attach, or bond with other portions or components of the forward fuselage 640 and/or other portions of the airframe design, e.g., with portions of the central bulkheads 106 as further described herein.

Further, the plurality of forward fuselage panels 642 and structural members 643 may include various holes, slots, fasteners, nuts, or other attachment elements configured to facilitate removable coupling of various attachable components as further described herein. The various attachable components may include processors, controllers, avionics, electronics, sensors, imaging devices, power supplies, antenna, package delivery systems, packages, or other subsystems or components.

The plurality of forward fuselage panels 642 and structural members 643 may be formed of various materials, such as carbon fiber, composites, aluminum, other metals, plastics, other materials, or combinations thereof. In example embodiments, the plurality of forward fuselage panels 642 may preferably be formed of carbon fiber or other composites, e.g., using one or more plies of carbon fiber or other composites, and the plurality of structural members 643 may preferably be formed of aluminum or other metals.

As shown in FIG. 6B, the plurality of forward fuselage panels 642 and structural members 643 may be bonded together, e.g., using film adhesive, paste adhesive, or other types of adhesives, to form a portion of the airframe.

In this manner, the bonded forward fuselage panels 642 and structural members 643 may form the structure, e.g., similar to a bonded uni-body structure or exoskeleton, for the forward fuselage 640. Further, the forward fuselage 640 may be removably coupled or attached, e.g., using fasteners or other attachment elements, to the bonded frame or assembly, e.g., via attachment to the forward central bulkhead.

In an alternative example embodiment, one or more portions of the forward fuselage 640, including one or more of the plurality of forward fuselage panels 642 and structural members 643, may be integrally formed with one or more of the central bulkheads, including the forward central bulkhead and/or the aft central bulkhead. With the integral formation of one or more portions of the forward fuselage 640 with one or more of the central bulkheads, the number of parts of the bonded frame or assembly may be further reduced, thereby reducing complexity, cost, and weight, while also improving strength and stiffness of the overall structure of the airframe design.

As shown in FIG. 6C, the various attachable components may include one or more access panels 644, one or more components 645, and a nose cone 646. For example, the one or more access panels 644 may be removably coupled or attached to the forward fuselage panels 642 to facilitate fabrication, assembly, and maintenance associated with the forward fuselage 640 and various components therein. In addition, the nose cone 646 may also be removably coupled or attached to the forward fuselage 640 to facilitate fabrication, assembly, and maintenance associated with the forward fuselage 640 and various components therein. In some example embodiments, the nose cone 646 may include one or more access panels to facilitate removal and replacement of power supplies.

The one or more components 645 may include processors, controllers 645-2, avionics, electronics 645-1, heat management systems 645-3, sensors 645-5, 645-6, imaging devices, power supplies 645-4, antenna 645-7, 645-8, package delivery systems, packages, or other subsystems or components that may be removably coupled or attached to the forward fuselage 640. In some example embodiments, one or more components 645 may be positioned or configured as a structural part of one or more forward fuselage panels 642, such as electronics 645-1, controller 645-2, and/or power supplies 645-4. In such examples, in addition to the primary functions or operations performed by such components, at least a portion of such components may also contribute to the structure, e.g., similar to a bonded uni-body structure or exoskeleton, of the forward fuselage 640. Further, the positioning of such components as part of one or more forward fuselage panels 642 may further facilitate fabrication, assembly, and maintenance associated with the forward fuselage 640 and various components therein.

The access panels 644 and nose cone 646 may be formed of various materials, such as carbon fiber, composites, aluminum, other metals, plastics, other materials, or combinations thereof. In example embodiments, the access panels 644 and nose cone 646 may preferably be formed of carbon fiber, other composites, or plastics.

In this manner, the forward fuselage 640 may be removably attached to a bonded frame or assembly. Further, the forward fuselage 640 may receive and removably house a plurality of attachable components. Thus, the design and configuration of the forward fuselage 640 may facilitate fabrication, assembly, and maintenance of the forward fuselage 640 as a single unit, as well as fabrication, assembly, and maintenance of various attachable components received by and removably housed within the forward fuselage 640.

Figure 7A:
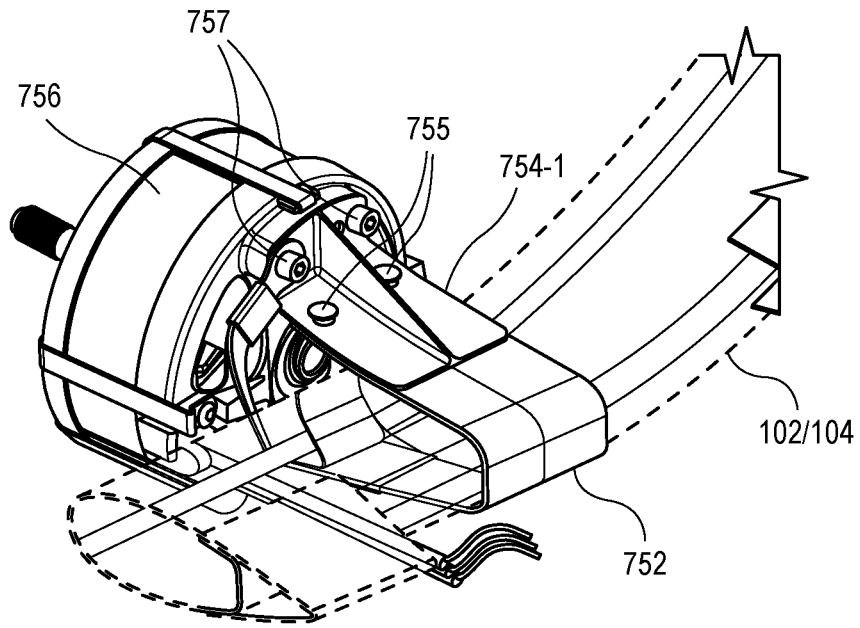
FIG. 7A is a schematic, bonded, rear perspective view diagram of example motor mounts of an airframe design, in accordance with implementations of the present disclosure.
Figure 7B:
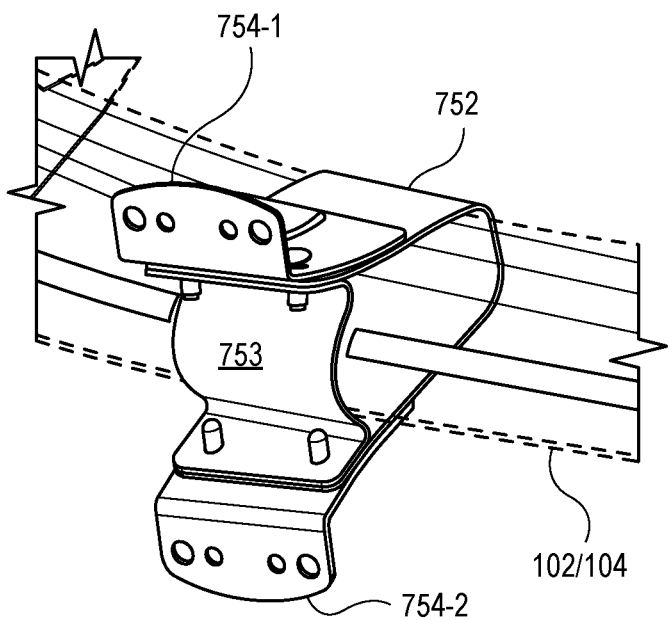
FIG. 7B is a schematic, bonded, front perspective view diagram of example motor mounts of an airframe design, in accordance with implementations of the present disclosure.

FIG. 7A is a schematic, bonded, rear perspective view diagram of example motor mounts of an airframe design, in accordance with implementations of the present disclosure. FIG. 7B is a schematic, bonded, front perspective view diagram of example motor mounts of an airframe design, in accordance with implementations of the present disclosure.

The motor mounts 650 may comprise a plurality of portions, including a collar 752, a retainer 753, an upper motor bracket 754-1, and a lower motor bracket 754-2. The plurality of portions of the motor mounts 650 may contact and bond with portions of the struts 102, 104 and may generally face toward a forward flight direction of the aerial vehicle in a horizontal flight configuration.

The collar 752 may be shaped to make contact and bond with outer surfaces of the struts 102, 104, e.g., at least partially extending around a trailing edge of the struts 102, 104. The retainer 753 may be shaped to make contact and bond with outer surfaces of the struts 102, 104, e.g., at least partially extending around a leading edge of the struts 102, 104. In addition, the collar 752 and retainer 753 may bond with each other along corresponding mating surfaces proximate the leading edge of the struts 102, 104.

The upper and lower motor brackets 754-1, 754-2 may be shaped to make contact and bond with portions of the collar 752, and may be further attached to portions of the collar 752 and retainer 753 via rivets 755, e.g., bond assist rivets to hold relative positions of the portions of the motor mounts 650 during bonding. Further, the upper and lower motor brackets 754-1, 754-2 may each include flanges with corresponding holes, slots, fasteners 757, nuts, or other attachment elements configured to facilitate removable coupling of motors 756 and propellers as further described herein.

The plurality of portions of the motor mounts 650 may be formed of various materials, such as carbon fiber, composites, aluminum, other metals, plastics, other materials, or combinations thereof. In example embodiments, the plurality of portions of the motor mounts 650 may preferably be formed of carbon fiber or other composites, e.g., using one or more plies of carbon fiber or other composites, or aluminum or other metals.

As shown in FIGS. 7A and 7B, the plurality of portions of the motor mounts 650 may be bonded together with portions of the struts 102, 104 and adjacent portions of the motor mounts, e.g., using film adhesive, paste adhesive, or other types of adhesives, to form a portion of the airframe.

For example, the collar 752 may be bonded to an outer surface, e.g., including a trailing edge, of a strut 102, 104. In addition, the retainer 753 may be bonded to an outer surface, e.g., including a leading edge, of a strut 102, 104 and to corresponding mating surfaces with the collar 752. Moreover, the upper and lower motor brackets 754-1, 754-2 may be riveted to the collar 752 and retainer 753, and bonded to outer surfaces of the collar 752.

In this manner, the bonded struts 102, 104 and motor mounts 650 may form a portion of the overall structure of the airframe design.

Figure 8A:
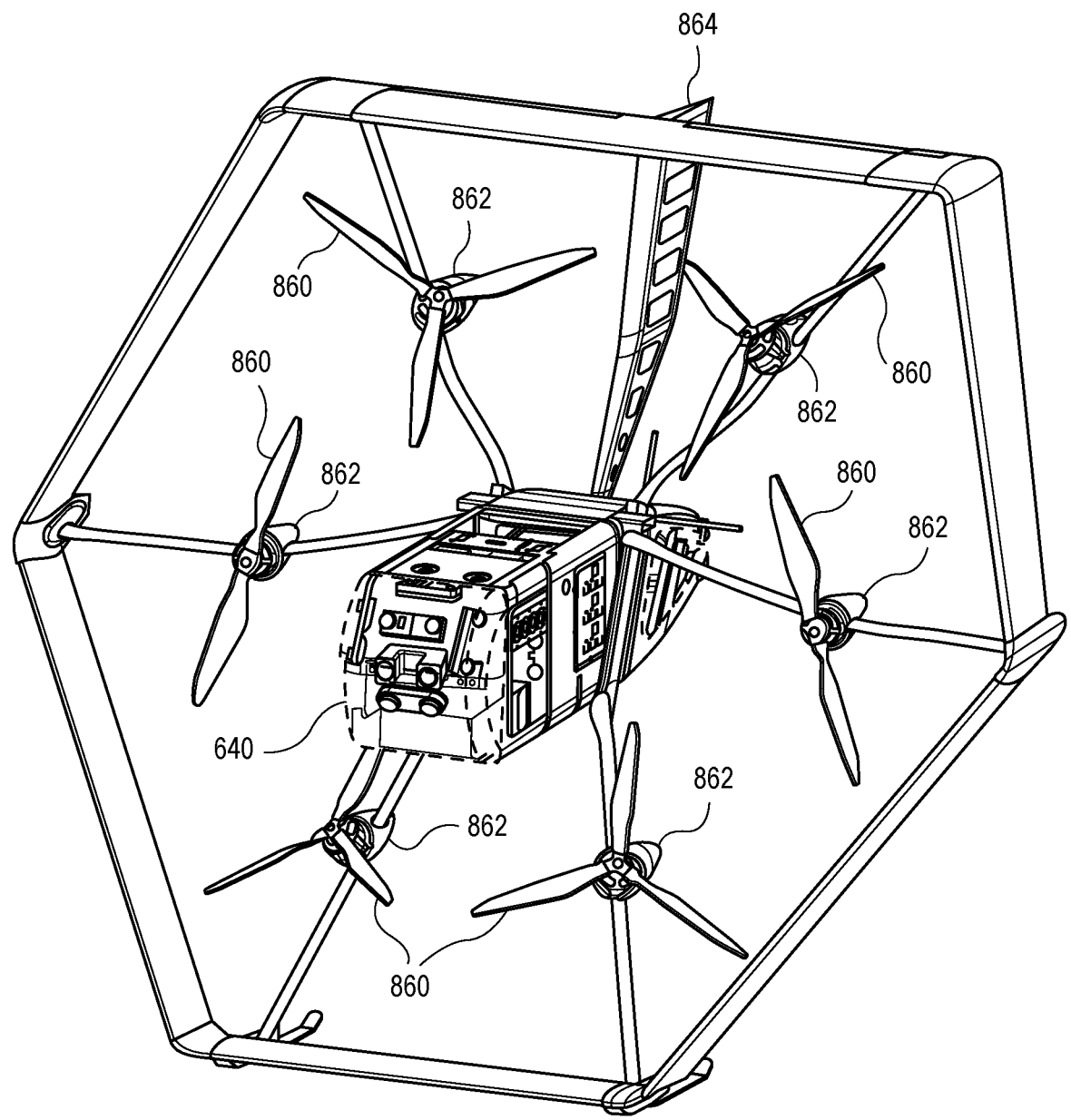
FIG. 8A is a schematic, assembled, front perspective view diagram of example motors, propellers, motor pod fairings, and stabilizer fin of an airframe design, in accordance with implementations of the present disclosure.

FIG. 8A is a schematic, assembled, front perspective view diagram of example motors, propellers, motor pod fairings, and stabilizer fin of an airframe design, in accordance with implementations of the present disclosure.

Referring back to the bonded struts 102, 104, central bulkheads 106, plurality of tail section panels 108, tail section bulkhead 210, upper and lower wing sections 312-1, 312-2, upper and lower side wing sections 314-1, 314-2, and motor mounts 650 that may substantially form the overall structure of the airframe design, e.g., the bonded frame or assembly, as illustrated in FIGS. 3C and 6A, a forward fuselage 640 may be attached to the bonded frame or assembly, e.g., fastened or removably coupled to the forward central bulkhead 106-1 of the bonded frame. In addition, a plurality of propellers 860, respective motors 756, and motor pod fairings 862 may be attached, fastened, or removably coupled to respective motor mounts 650 of the bonded frame or assembly. Further, a stabilizer fin 864 may also be attached to the bonded frame or assembly, e.g., fastened or removably coupled to the upper wing section 312-1 and the tail section.

As described herein, the forward fuselage 640 may be removably coupled to the forward central bulkhead extending toward a forward flight direction of the aerial vehicle in a horizontal flight configuration, as shown in FIG. 8A. In addition, the plurality of propellers 860 and respective motors 756 may be removably coupled to the plurality of motor mounts 650 generally facing toward a forward flight direction of the aerial vehicle in a horizontal flight configuration. Further, the motor pod fairings 862 may be removably coupled to the plurality of motor mounts 650 generally facing away from a forward flight direction of the aerial vehicle in a horizontal flight configuration.

The plurality of propellers 860 and motor pod fairings 862 may be formed of various materials, such as carbon fiber, composites, aluminum, other metals, plastics, other materials, or combinations thereof. In example embodiments, the plurality of propellers 860 and motor pod fairings 862 may preferably be formed of carbon fiber or other composites, e.g., using one or more plies of carbon fiber or other composites.

In this manner, the plurality of propellers 860, respective motors 756, and motor pod fairings 862 may be removably attached to a bonded frame or assembly, thereby facilitating fabrication, assembly, and maintenance of the various components of the aerial vehicle.

Figure 8B:
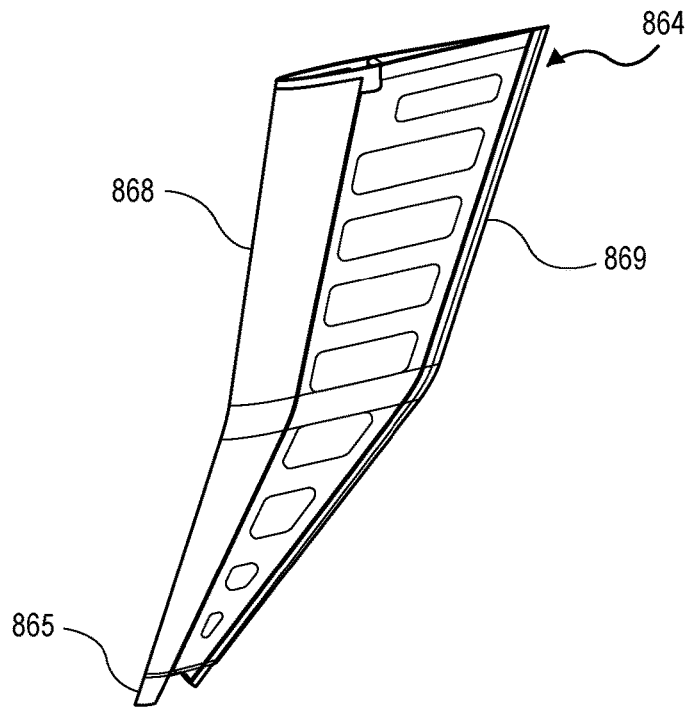
FIG. 8B is a schematic, front perspective view diagram of an example stabilizer fin of an airframe design, in accordance with implementations of the present disclosure.
Figure 8C:
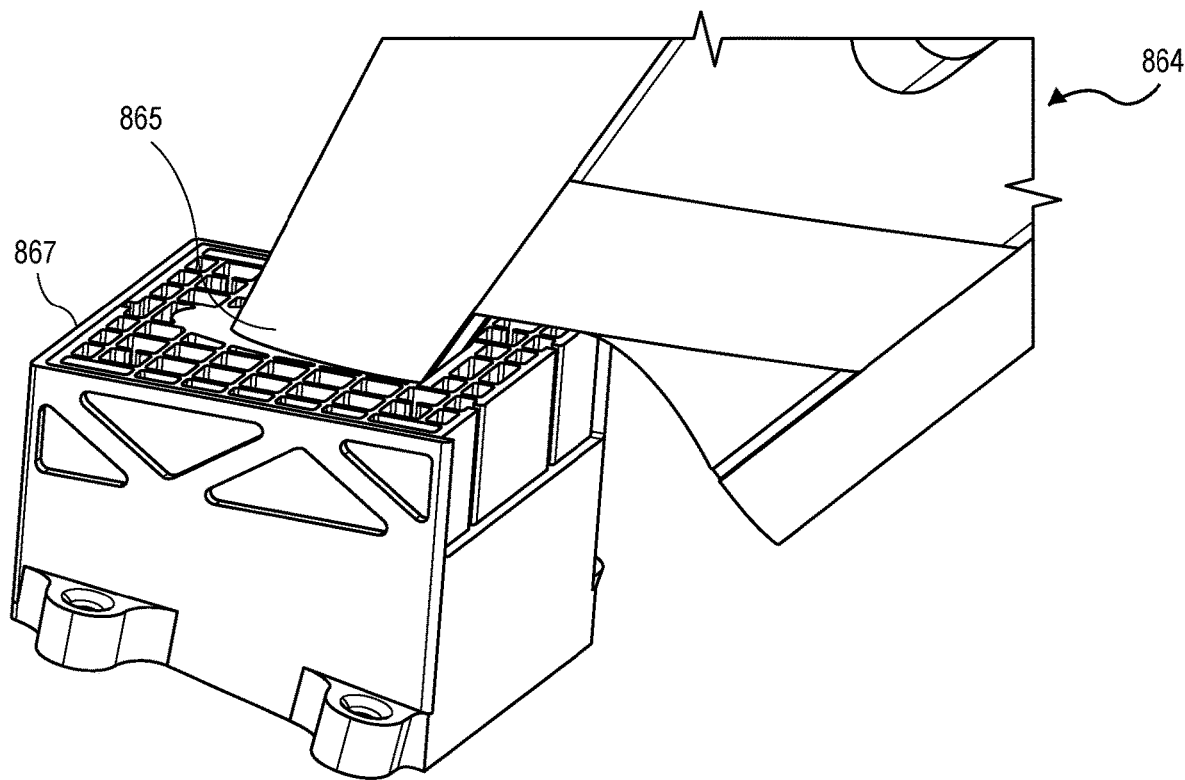
FIG. 8C is a schematic, side perspective view diagram of an example stabilizer fin and tail section mount of an airframe design, in accordance with implementations of the present disclosure.

FIG. 8B is a schematic, front perspective view diagram of an example stabilizer fin of an airframe design, in accordance with implementations of the present disclosure. FIG. 8C is a schematic, side perspective view diagram of an example stabilizer fin and tail section mount of an airframe design, in accordance with implementations of the present disclosure.

The stabilizer fin 864 may have an airfoil cross-section that varies over the vertical length, or span, of the stabilizer fin 864, as shown in FIG. 8B. The various aspects of the airfoil cross-section, e.g., chord length, thickness, camber, leading edge 868, trailing edge 869, or other aspects, of portions of the stabilizer fin 864 may vary over its span. For example, the chord length may vary over the span of the stabilizer fin 864, with a longer chord length proximate an attachment to the upper wing section, and a shorter chord length proximate an attachment to the tail section. Further, as shown in FIG. 8B, the chord length may have a first linear variation over a first portion of the span of the stabilizer fin 864, and may have a second linear variation over a second portion of the span of the stabilizer fin 864.

The stabilizer fin 864 may be removably coupled to the upper wing section, e.g., at an approximate center of the upper wing section, via attachment to a bracket associated with the upper wing section using fasteners. The bracket of the upper wing section may be bonded to the upper wing section, or may be formed integrally with the upper wing section.

The stabilizer fin 864 may be removably coupled to the tail section, e.g., via a slot or hole 207 of the upper tail section panel 108-1, as shown in FIG. 2, using a floating connection. The floating connection may comprise a three-dimensional lattice 867 into which an end 865 of the stabilizer fin 864 may be inserted. The three-dimensional lattice 867 may be formed of an at least partially compliant or flexible material, such as rubber, silicone, or other similar materials. In addition, the three-dimensional lattice 867 may be fabricated via 3-D printing or other manufacturing methods.

The three-dimensional lattice 867 may be designed, configured, or formed to have different amounts or levels of compliance associated with different directions relative to the three-dimensional lattice 867. For example, the three-dimensional lattice 867 may be relatively more compliant in an up-down direction or fore-aft direction relative to a forward flight direction of the aerial vehicle in a horizontal flight configuration. Further, the three-dimensional lattice 867 may be relatively less compliant in a left-right direction relative to a forward flight direction of the aerial vehicle in a horizontal flight configuration.

The stabilizer fin 864 may be formed of various materials, such as carbon fiber, composites, aluminum, other metals, plastics, other materials, or combinations thereof. In example embodiments, the stabilizer fin 864 may preferably be formed of carbon fiber or other composites, e.g., using one or more plies of carbon fiber or other composites.

In this manner, the stabilizer fin 864 may be removably attached to a bonded frame or assembly, thereby facilitating fabrication, assembly, and maintenance of the various components of the aerial vehicle.

Figure 9:
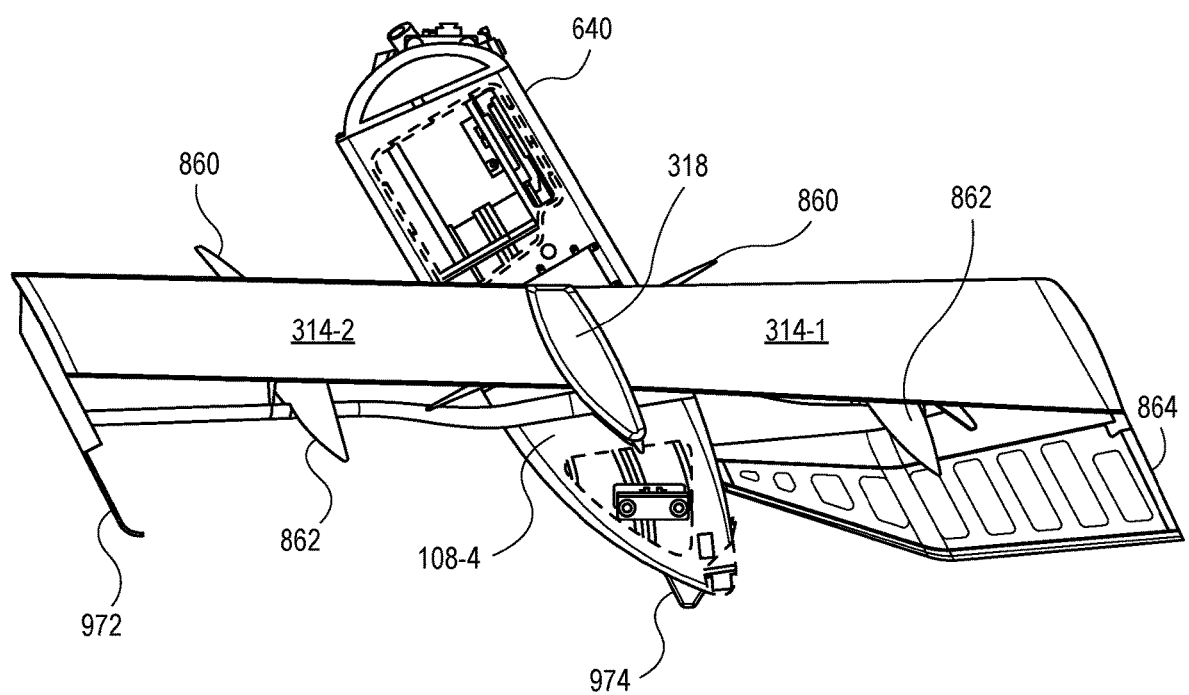
FIG. 9 is a schematic, assembled, side view diagram of example landing gear of an airframe design, in accordance with implementations of the present disclosure.

FIG. 9 is a schematic, assembled, side view diagram of example landing gear of an airframe design, in accordance with implementations of the present disclosure.

Referring back to the bonded struts 102, 104, central bulkheads 106, plurality of tail section panels 108, tail section bulkhead 210, upper and lower wing sections 312-1, 312-2, upper and lower side wing sections 314-1, 314-2, and motor mounts 650 that may substantially form the overall structure of the airframe design, e.g., the bonded frame or assembly, as illustrated in FIGS. 3C, 6A, and 8A, one or more landing gear 972, 974 may be attached to the bonded frame or assembly, e.g., fastened or removably coupled to the lower brackets 316-2, the tail section panels 108, and/or the tail section bulkhead 210.

The lower landing gear 972 may be coupled to the lower brackets 316-2 that are bonded to the lower wing section 312-2, lower side wing sections 314-2, and second, lower ends of the vertical struts 102. Each lower bracket 316-2 may include a respective lower landing gear 972. The lower landing gear 972 may generally extend away from a forward flight direction of the aerial vehicle in a horizontal flight configuration, as shown in FIG. 8A, and may generally extend toward a downward flight direction of the aerial vehicle in a vertical flight configuration, as shown in FIG. 9.

The lower landing gear 972 may be formed of various materials, such as carbon fiber, composites, aluminum, other metals, plastics, other materials, or combinations thereof. In example embodiments, the lower landing gear 972 may preferably be formed or shaped as an at least partially compliant or flexible metal, plastic, or composite beam, e.g., similar to a leaf spring, to facilitate compliant and safe landing of the aerial vehicle.

The tail section landing gear 974 may be coupled to the tail section panels 108 and/or the tail section bulkhead 210 that is bonded to the tail section panels 108. One or more tail section landing gear 974 may be attached to the tail section panels 108 and/or the tail section bulkhead 210 along its width, and/or the tail section landing gear 974 may extend at least partially, or substantially completely, along the width of the tail section bulkhead 210. The tail section landing gear 974 may generally extend away from a forward flight direction of the aerial vehicle in a horizontal flight configuration, as shown in FIG. 8A, and may generally extend toward a downward flight direction of the aerial vehicle in a vertical flight configuration, as shown in FIG. 9.

The tail section landing gear 974 may be formed of various materials, such as composites, aluminum, other metals, plastics, rubber, silicone, other materials, or combinations thereof. In example embodiments, the tail section landing gear 974 may preferably be formed of an at least partially compliant or flexible elastomeric, rubber, or silicone material having a desired elasticity, e.g., similar to a rubber bumper, to facilitate compliant and safe landing of the aerial vehicle.

In this manner, the landing gear 972, 974 may be removably attached to a bonded frame or assembly, thereby facilitating fabrication, assembly, and maintenance of the various components of the aerial vehicle.

Figure 10:
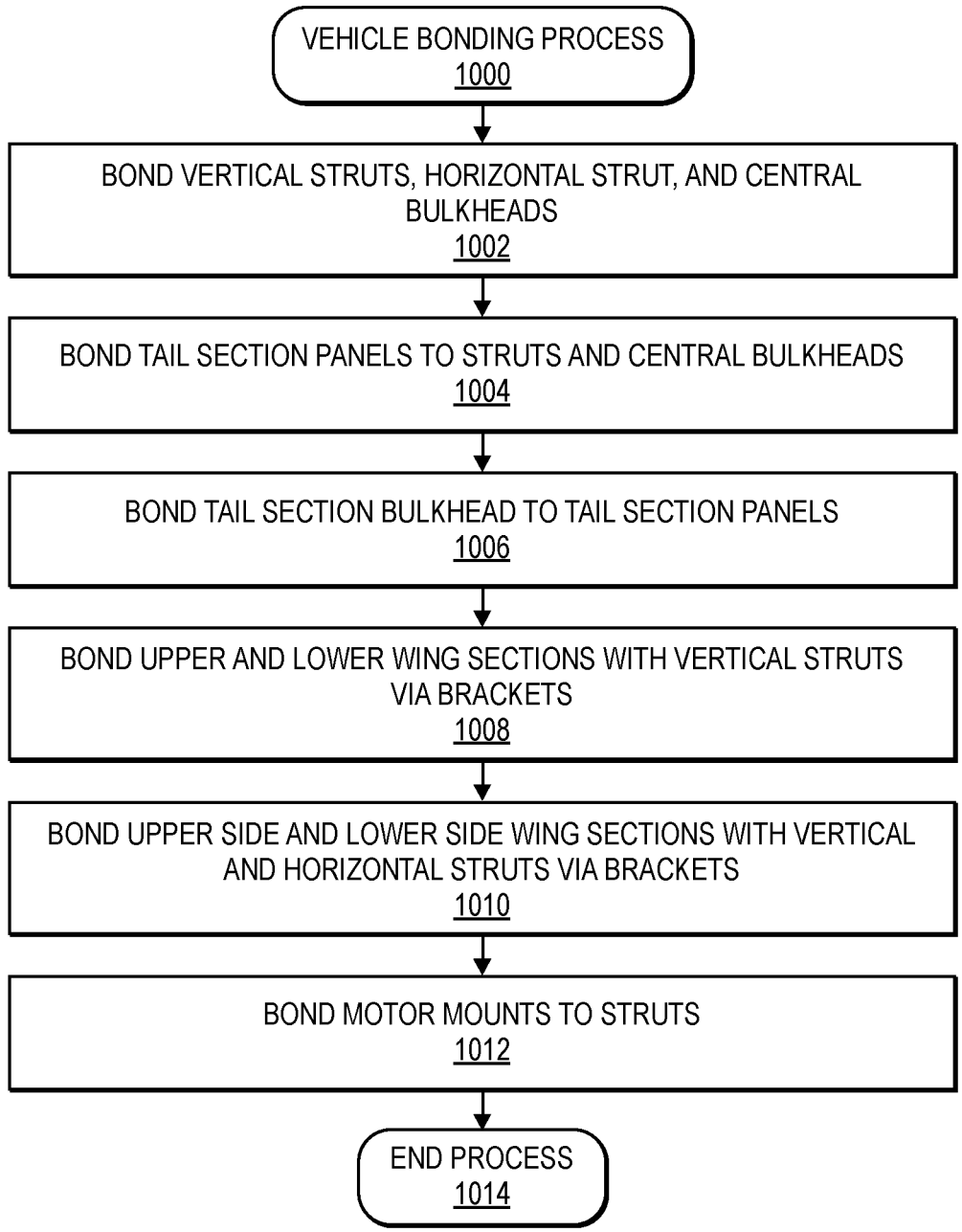
FIG. 10 is a flow diagram illustrating an example vehicle bonding process, in accordance with implementations of the present disclosure.

FIG. 10 is a flow diagram illustrating an example vehicle bonding process 1000, in accordance with implementations of the present disclosure.

The process 1000 may begin by bonding vertical struts, a horizontal strut, and central bulkheads, as at 1002. For example, as shown and described at least with respect to FIGS. 1A and 1B, two vertical struts and a horizontal strut may be bonded together. In addition, a forward central bulkhead and an aft central bulkhead may be bonded to the two vertical struts and the horizontal strut. In this manner, the bonded struts and central bulkheads may form a portion of the overall structure of the airframe design.

The process 1000 may continue by bonding tail section panels to the struts and the central bulkheads, as at 1004. For example, as shown and described at least with respect to FIGS. 1C, 1D, and 2, an upper tail section panel, a lower tail section panel, and two side tail section panels may be bonded together. In addition, the tail section panels may be bonded to the two vertical struts, the horizontal strut, and the central bulkheads. In this manner, the bonded tail section panels may form the structure, e.g., similar to a bonded uni-body structure or exoskeleton, for the tail section. Further, the bonded struts, central bulkheads, and plurality of tail section panels may form a portion of the overall structure of the airframe design.

The process 1000 may proceed by bonding a tail section bulkhead the tail section panels, as at 1006. For example, as shown and described at least with respect to FIGS. 1C, 1D, and 2, a tail section bulkhead may be bonded to the plurality of tail section panels, that may in turn be bonded to the two vertical struts, the horizontal strut, and the central bulkheads. In this manner, the bonded tail section panels and tail section bulkhead may form the structure, e.g., similar to a bonded uni-body structure or exoskeleton, for the tail section. Further, the bonded struts, central bulkheads, plurality of tail section panels, and tail section bulkhead may form a portion of the overall structure of the airframe design.

The process 1000 may continue to bond upper and lower wing sections with the vertical struts via brackets, as at 1008. For example, as shown and described at least with respect to FIGS. 3A-5B, an upper wing section may be bonded to first, upper ends of the vertical struts via upper brackets. In addition, a lower wing section may be bonded to second, lower ends of the vertical struts via lower brackets. In this manner, the bonded struts, central bulkheads, plurality of tail section panels, tail section bulkhead, and upper and lower wing sections may form a portion of the overall structure of the airframe design.

The process 1000 may proceed to bond upper side and lower side wing sections with vertical and horizontal struts via brackets, as at 1010. For example, as shown and described at least with respect to FIGS. 3A-5B, an upper side wing section may be bonded to a respective first, upper end of a vertical strut via an upper bracket. In addition, a lower side wing section may be bonded to a respective second, lower end of a vertical strut via a lower bracket. Further, the upper side wing section and the lower side wing section may each be bonded to an end of a horizontal strut via a side bracket. In this manner, the bonded struts, central bulkheads, plurality of tail section panels, tail section bulkhead, upper and lower wing sections, and upper and lower side wing sections may substantially form the overall structure of the airframe design, e.g., the bonded frame or assembly.

The process 1000 may continue with bonding motor mounts to the struts, as at 1012. For example, as shown and described at least with respect to FIGS. 6A, 7A, and 7B, a plurality of motor mounts may be bonded to respective struts. In example embodiments, two motor mounts may be bonded to each of the two vertical struts and the horizontal strut. In this manner, the bonded struts, central bulkheads, plurality of tail section panels, tail section bulkhead, upper and lower wing sections, upper and lower side wing sections, and motor mounts may substantially form the overall structure of the airframe design, e.g., the bonded frame or assembly.

The process 1000 may then end, as at 1014.

Figure 11:
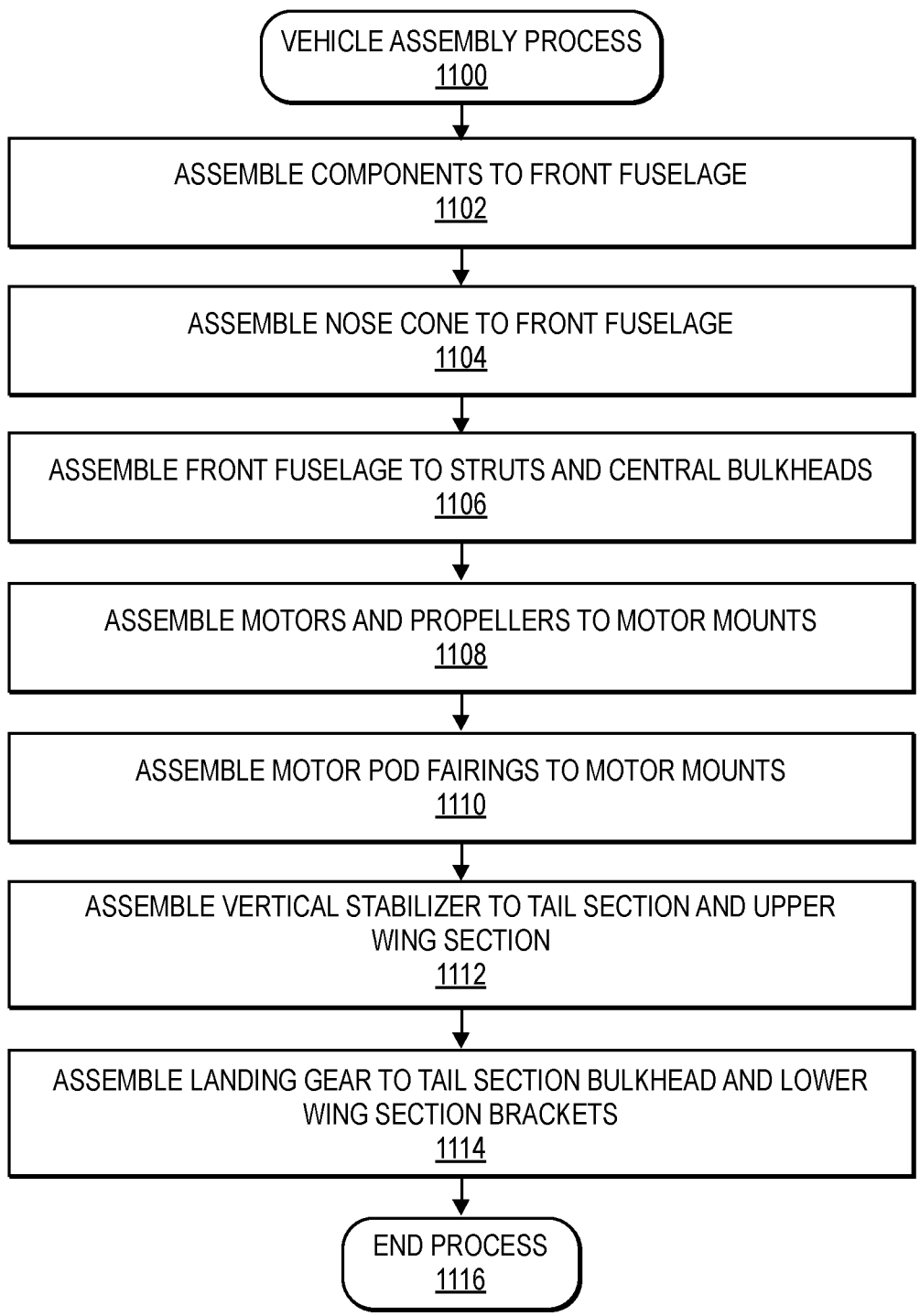
FIG. 11 is a flow diagram illustrating an example vehicle assembly process, in accordance with implementations of the present disclosure.

FIG. 11 is a flow diagram illustrating an example vehicle assembly process 1100, in accordance with implementations of the present disclosure.

The process 1100 may begin by assembling components to the front fuselage, as at 1102. For example, as shown and described at least with respect to FIGS. 6A-6C, the front fuselage may comprise a plurality of forward fuselage panels and a plurality of structural members. In addition, the front fuselage may comprise various attachable components including one or more access panels, one or more components, and a nose cone. Further, the one or more components may include processors, controllers, avionics, electronics, heat management systems, sensors, imaging devices, power supplies, antenna, package delivery systems, packages, or other subsystems or components that may be removably coupled or attached, e.g., using fasteners or other attachment elements, to the forward fuselage. In this manner, the forward fuselage may receive and removably house a plurality of attachable components.

The process 1100 may continue by assembling a nose cone to the front fuselage, as at 1104. For example, as shown and described at least with respect to FIGS. 6A-6C, the front fuselage may comprise various attachable components including one or more access panels, one or more components, and a nose cone. Further, the nose cone may receive or house one or more components including processors, controllers, avionics, electronics, sensors, imaging devices, power supplies, antenna, or other subsystems or components that may be removably coupled or attached, e.g., using fasteners or other attachment elements, to the nose cone and/or the forward fuselage. In this manner, the nose cone and/or forward fuselage may receive and removably house a plurality of attachable components.

The process 1100 may proceed by assembling the front fuselage to the struts and central bulkheads, as at 1106. For example, as shown and described at least with respect to FIGS. 6A-6C and 8A, the front fuselage may comprise a plurality of forward fuselage panels and a plurality of structural members. In addition, the front fuselage may comprise various attachable components including one or more access panels, one or more components, and a nose cone. Further, the bonded forward fuselage panels and structural members may form the structure, e.g., similar to a bonded uni-body structure or exoskeleton, for the forward fuselage. Moreover, the forward fuselage may be removably coupled or attached, e.g., using fasteners or other attachment elements, to the bonded frame or assembly, e.g., via attachment to the forward central bulkhead. In this manner, the forward fuselage may be removably attached to a bonded frame or assembly.

The process 1100 may continue to assemble motors and propellers to the motor mounts, as at 1108. For example, as shown and described at least with respect to FIGS. 7A, 7B, and 8A, a plurality of motors and propellers may be removably coupled or attached, e.g., using fasteners or other attachment elements, to the motor mounts of the bonded frame or assembly. In this manner, the motors and propellers may be removably attached to the motor mounts of the bonded frame or assembly.

The process 1100 may proceed to assemble motor pod fairings to the motor mounts, as at 1110. For example, as shown and described at least with respect to FIGS. 7A, 7B, 8A, and 9, a plurality of motor pod fairings may be removably coupled or attached, e.g., using fasteners or other attachment elements, to the motor mounts of the bonded frame or assembly. In this manner, the motor pod fairings may be removably attached to the motor mounts of the bonded frame or assembly.

The process 1100 may then continue with assembling a vertical stabilizer fin to the tail section and the upper wing section, as at 1112. For example, as shown and described at least with respect to FIGS. 2, 8A-8C, and 9, an upper end of the stabilizer fin may be removably coupled or attached, e.g., using fasteners or other attachment elements, to the upper wing section of the bonded frame or assembly, and a lower end of the stabilizer fin may be removably coupled or attached, e.g., using a floating connection, to the tail section of the bonded frame or assembly. In this manner, the vertical stabilizer fin may be removably attached to the bonded frame or assembly.

The process 1100 may then proceed with assembling landing gear to the tail section bulkhead and the lower wing section brackets, as at 1114. For example, as shown and described at least with respect to FIGS. 2 and 9, lower landing gear may be removably coupled or attached, e.g., using fasteners or other attachment elements, to the lower brackets associated with the lower wing section of the bonded frame or assembly, and tail section landing gear may be removably coupled or attached, e.g., using fasteners or other attachment elements, to the tail section panels and/or the tail section bulkhead of the bonded frame or assembly. In this manner, the lower landing gear and tail section landing gear may be removably attached to the bonded frame or assembly.

The process 1100 may then end, as at 1116.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 10 and 11, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An aerial vehicle, comprising:
   a frame, comprising:
      a bonded assembly, including:
         one horizontal strut;
         two vertical struts;
         a forward central bulkhead;
         an aft central bulkhead;
         a tail section;
         an upper wing section;
         a lower wing section; and
         six motor mounts;
      wherein the bonded assembly is adhered together using adhesive;
      wherein the forward central bulkhead comprises a substantially flat plate that is bonded to an underside of the one horizontal strut, and is bonded to forward surfaces of the two vertical struts; and
      wherein the aft central bulkhead comprises a substantially flat plate that is bonded to rearward surfaces of the two vertical struts.

2. The aerial vehicle of claim 1, further comprising:
   at least one component attached to the bonded assembly, the at least one component including at least one of a forward fuselage, a nose cone, a motor, a propeller, a motor pod fairing, a vertical stabilizer, or a landing gear;
   wherein the at least one component is attached to the bonded assembly using fasteners.

3. The aerial vehicle of claim 1, wherein the tail section includes an upper tail section panel, a lower tail section panel, two side tail section panels, and a tail section bulkhead that are bonded together; and
   wherein the tail section is bonded to the one horizontal strut, the two vertical struts, the forward central bulkhead, and the aft central bulkhead.

4. The aerial vehicle of claim 1, wherein the upper wing section is bonded to first ends of the two vertical struts via upper brackets; and
   wherein the lower wing section is bonded to second ends of the two vertical struts via lower brackets.

5. The aerial vehicle of claim 1, wherein respective two motor mounts of the six motor mounts are bonded to each of the one horizontal strut and the two vertical struts.

6. An aerial vehicle, comprising:
   a bonded frame, comprising:
      a horizontal strut;
      two vertical struts;
      a central bulkhead;
      an upper wing section; and
      a lower wing section;
   wherein the bonded frame is adhered together using adhesive;
   wherein the central bulkhead comprises:
      a forward central bulkhead comprising a substantially flat plate; and
      an aft central bulkhead comprising a substantially flat plate;
   wherein the forward central bulkhead is bonded to each of the horizontal strut and the two vertical struts; and
   wherein the aft central bulkhead is bonded to each of the two vertical struts.

7. The aerial vehicle of claim 6, wherein the horizontal strut is bonded to each of the two vertical struts.

8. The aerial vehicle of claim 6, wherein each of the horizontal strut and the two vertical struts comprises:
   a box cross section proximate the central bulkhead; and
   a modified airfoil cross section at other portions of the horizontal strut and the two vertical struts.

9. The aerial vehicle of claim 6, wherein the bonded frame further comprises:
   a tail section bonded to the central bulkhead.

10. The aerial vehicle of claim 9, wherein the tail section comprises:
    an upper tail section panel;
    a lower tail section panel;
    two side tail section panels; and
    a tail section bulkhead;
    wherein the upper tail section panel, the lower tail section panel, the two side tail section panels, and the tail section bulkhead are bonded together; and wherein the tail section is further bonded to the horizontal strut and the two vertical struts.

11. The aerial vehicle of claim 6, wherein the bonded frame further comprises:
two upper side wing sections bonded to respective ends of the upper wing section; and
two lower side wing sections bonded to respective ends of the lower wing section.

12. The aerial vehicle of claim 6, wherein the upper wing section is bonded to first ends of the two vertical struts via upper brackets; and
wherein the lower wing section is bonded to second ends of the two vertical struts via lower brackets.

13. The aerial vehicle of claim 6, wherein each of the upper and lower wing sections comprises:
a hollow wing box between a front spar and a rear spar;
a leading edge section coupled to the front spar; and
a trailing edge section coupled to the rear spar.

14. The aerial vehicle of claim 13, wherein the hollow wing box further comprises:
at least one upper stringer extending spanwise along an upper surface of the hollow wing box;
at least one lower stringer extending spanwise along a lower surface of the hollow wing box; and
at least one rib extending chordwise along at least one of the upper surface or the lower surface of the hollow wing box.

15. The aerial vehicle of claim 6, further comprising:
a forward fuselage attached to the bonded frame;
wherein the forward fuselage is removably attached to the central bulkhead using fasteners.

16. A method of fabricating an aerial vehicle, comprising:
bonding, using adhesive, a horizontal strut to two vertical struts;
bonding, using adhesive, a forward central bulkhead to the horizontal strut and the two vertical struts;
bonding, using adhesive, an aft central bulkhead to the two vertical struts; and
bonding, using adhesive, an upper wing section and a lower wing section to respective ends of the two vertical struts via brackets.

17. The method of claim 16, further comprising:
bonding, using adhesive, a tail section to the horizontal strut, the two vertical struts, the forward central bulkhead, and the aft central bulkhead;
wherein bonding the tail section further comprises bonding, using adhesive, an upper tail section panel, a lower tail section panel, two side tail section panels, and a tail section bulkhead to form the tail section.

18. The method of claim 16, further comprising:
bonding, using adhesive, two upper side wing sections to respective ends of the upper wing section via upper brackets of the brackets; and
bonding, using adhesive, two lower side wing sections to respective ends of the lower wing section via lower brackets of the brackets.

19. The method of claim 16, further comprising:
bonding, using adhesive, two motor mounts to each of the horizontal strut and the two vertical struts.

20. The method of claim 19, further comprising at least one of:
removably attaching, using fasteners, a front fuselage to the forward central bulkhead;
removably attaching, using fasteners, a nose cone to the front fuselage;
removably attaching, using fasteners, motors and propellers to the motor mounts;
removably attaching, using fasteners, motor pod fairings to the motors;
removably attaching, using fasteners, a first end of a vertical stabilizer to the upper wing section and removably attaching, using a floating connection, a second end of the vertical stabilizer to a tail section;
removably attaching, using fasteners, flexible landing gear to the lower wing section; or
removably attaching, using fasteners, elastomeric landing gear to the tail section.

\* \* \* \* \*